United States Patent
Kamiyama et al.

(10) Patent No.: US 10,739,872 B2
(45) Date of Patent: Aug. 11, 2020

(54) ELECTRONIC PEN AND ELECTRONIC PEN MAIN BODY UNIT

(71) Applicant: Wacom Co., Ltd., Saitama (JP)

(72) Inventors: Ryoji Kamiyama, Ibaraki (JP); Toshihiko Horie, Saitama (JP); Shigeru Yamashita, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/138,456

(22) Filed: Sep. 21, 2018

(65) Prior Publication Data

US 2019/0025951 A1  Jan. 24, 2019

Related U.S. Application Data

(63) Continuation of application No. PCT/JP2017/014912, filed on Apr. 12, 2017.

(30) Foreign Application Priority Data

Apr. 22, 2016  (JP) .................................. 2016-086034

(51) Int. Cl.
| | |
|---|---|
| *G06F 3/0354* | (2013.01) |
| *B43K 7/12* | (2006.01) |
| *B43K 27/08* | (2006.01) |
| *B43K 24/16* | (2006.01) |
| *B43K 24/08* | (2006.01) |
| *B43K 29/08* | (2006.01) |
| *B43K 29/00* | (2006.01) |

(52) U.S. Cl.
CPC ............ *G06F 3/03545* (2013.01); *B43K 7/12* (2013.01); *B43K 24/08* (2013.01); *B43K 24/084* (2013.01); *B43K 24/163* (2013.01); *B43K 27/08* (2013.01); *B43K 29/00* (2013.01); *B43K 29/08* (2013.01)

(58) Field of Classification Search
CPC .................................................. G06F 3/03545
See application file for complete search history.

(56) References Cited

U.S. PATENT DOCUMENTS

| | | | |
|---|---|---|---|
| 2015/0015546 A1* | 1/2015 | Chien ................. | G06F 3/03545 345/179 |
| 2016/0018912 A1* | 1/2016 | Kaneda ............... | G06F 3/03545 345/179 |

FOREIGN PATENT DOCUMENTS

| | | |
|---|---|---|
| JP | 7-44304 A | 2/1995 |
| JP | 7-295722 A | 11/1995 |
| JP | 2011-186803 A | 9/2011 |
| JP | 2013-161307 A | 8/2013 |

* cited by examiner

*Primary Examiner* — Roy P Rabindranath
(74) *Attorney, Agent, or Firm* — Seed IP Law Group LLP

(57) ABSTRACT

An electronic pen has increased strength, especially a pen tip portion that is not bent or broken even if the electronic pen is slimmed down. A core unit includes a ferrite core on which a coil is wound and a core rod. The core rod is fixed from a first end of the ferrite core to a second end of the ferrite core at a position including a center axis of the ferrite core and projects at an end thereof from the first end of the ferrite core. The ferrite core includes a first coil non-winding portion on which the coil is not wound provided on the pen tip side of the ferrite core. In operation, the end of the core rod and part of the first coil non-winding portion of the ferrite core project from an opening of a housing of the electronic pen.

18 Claims, 15 Drawing Sheets

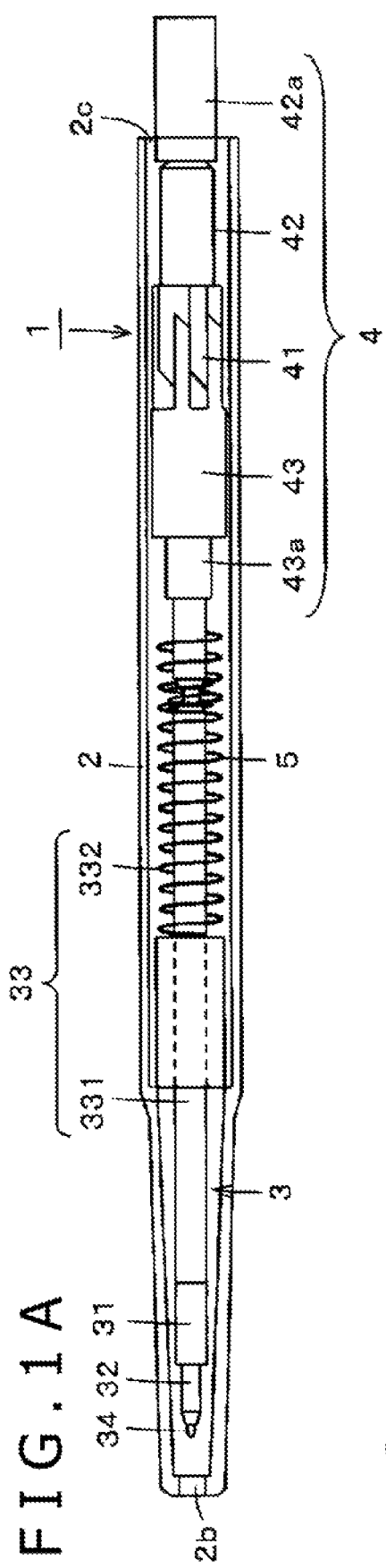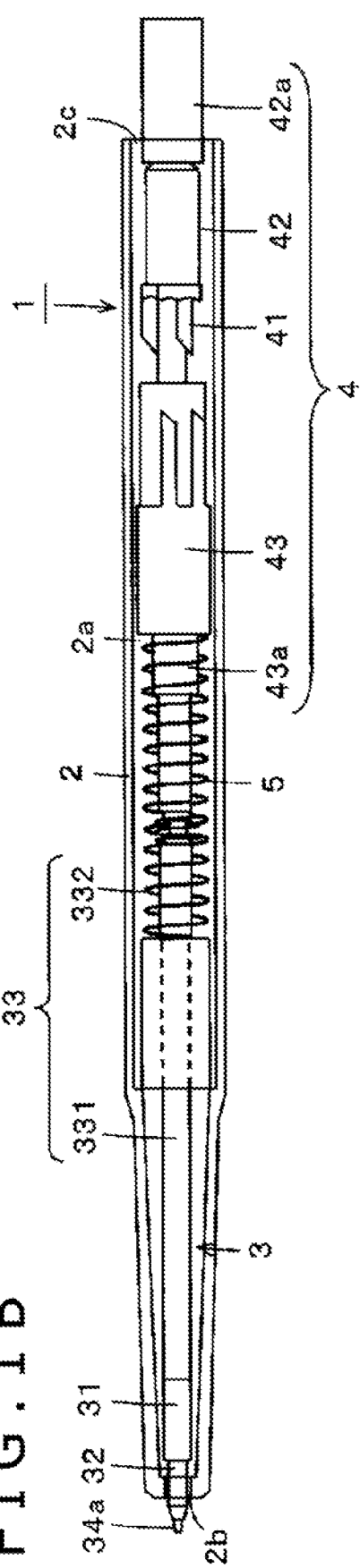

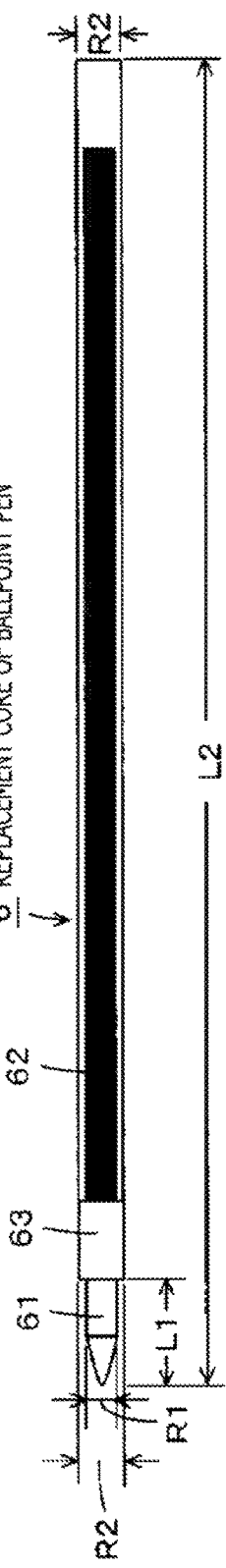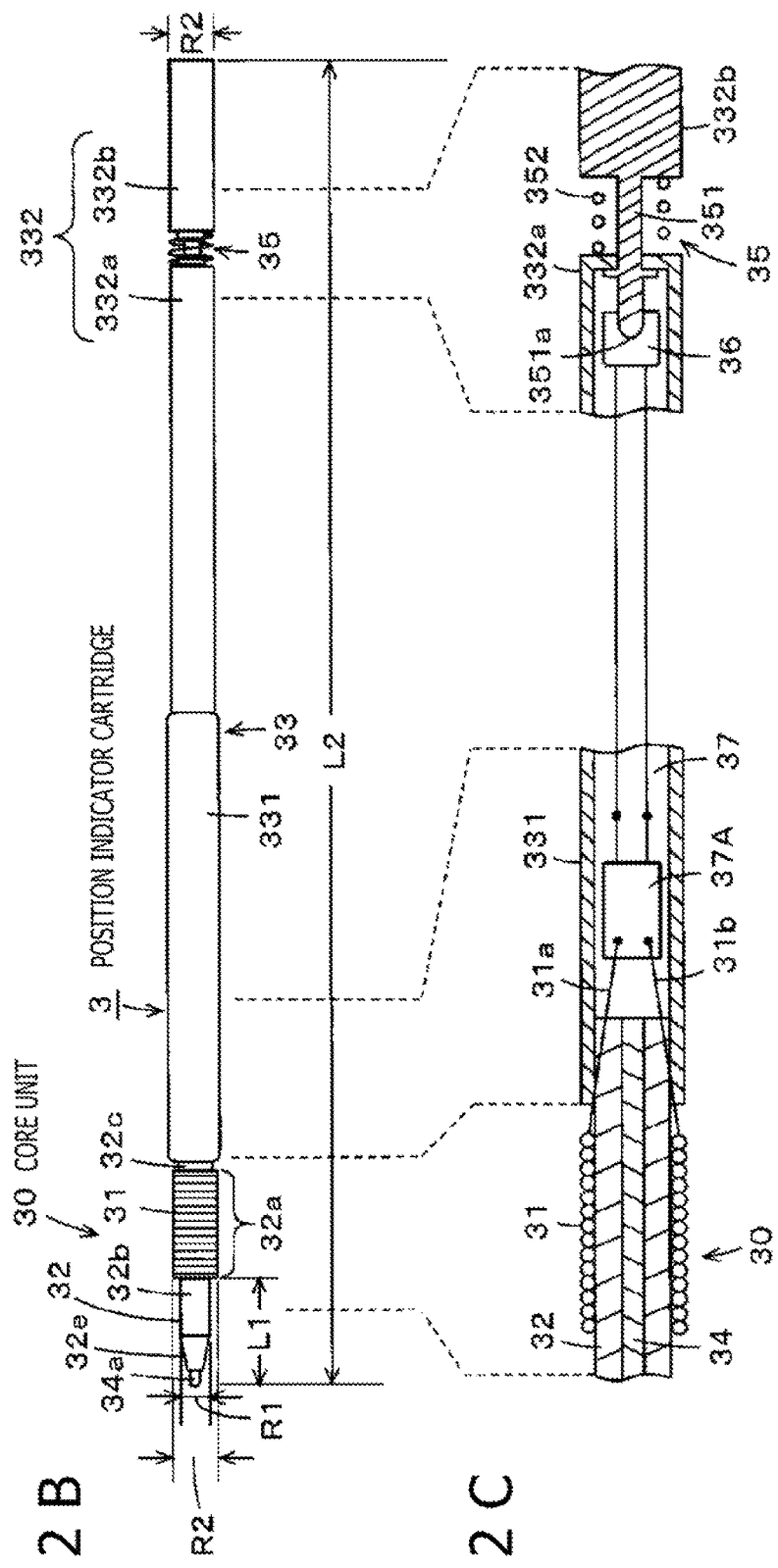

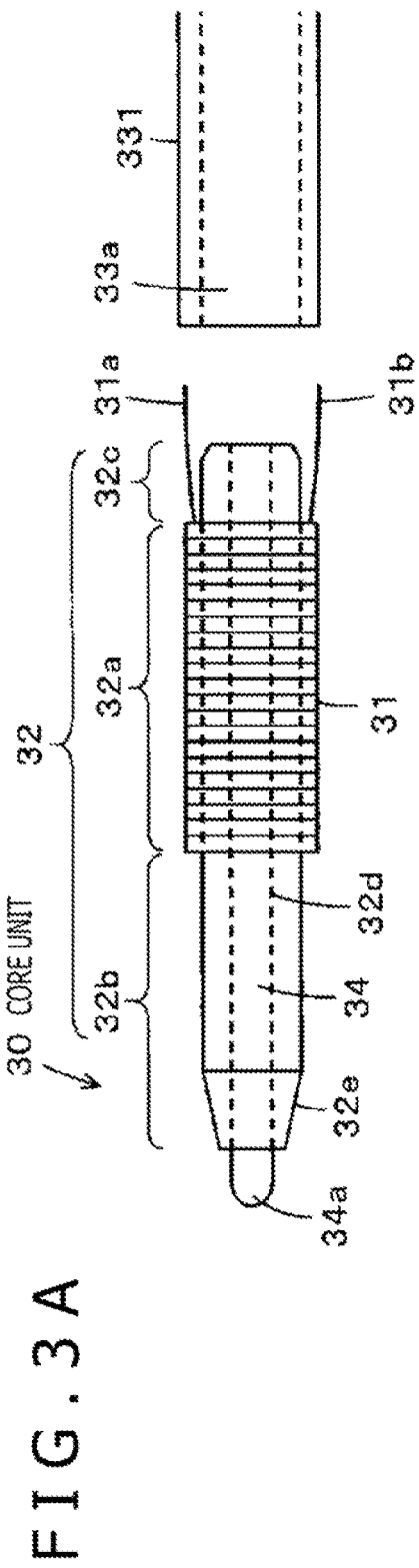
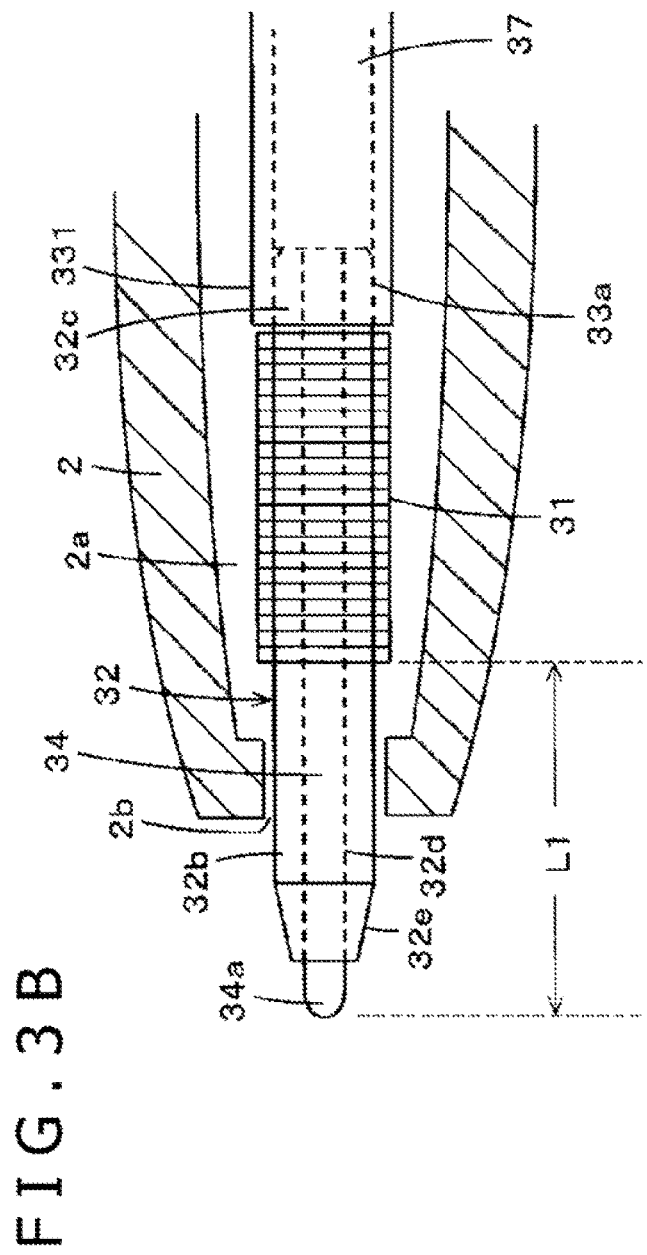

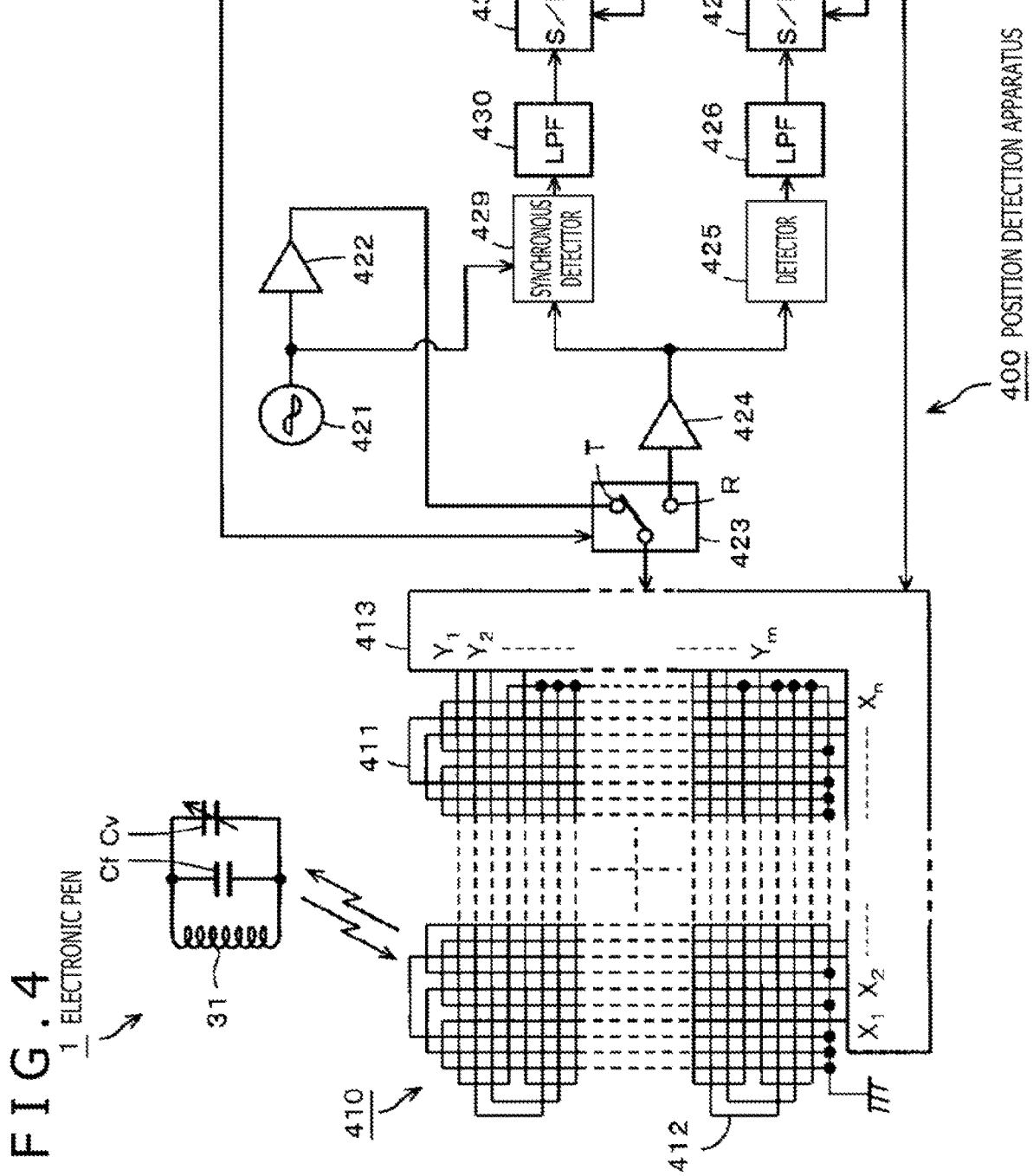

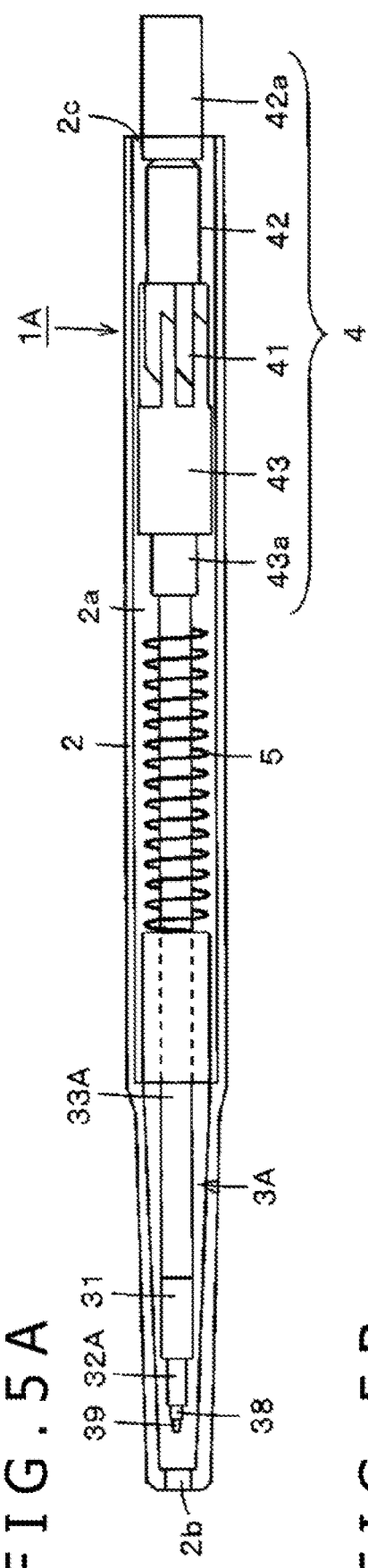
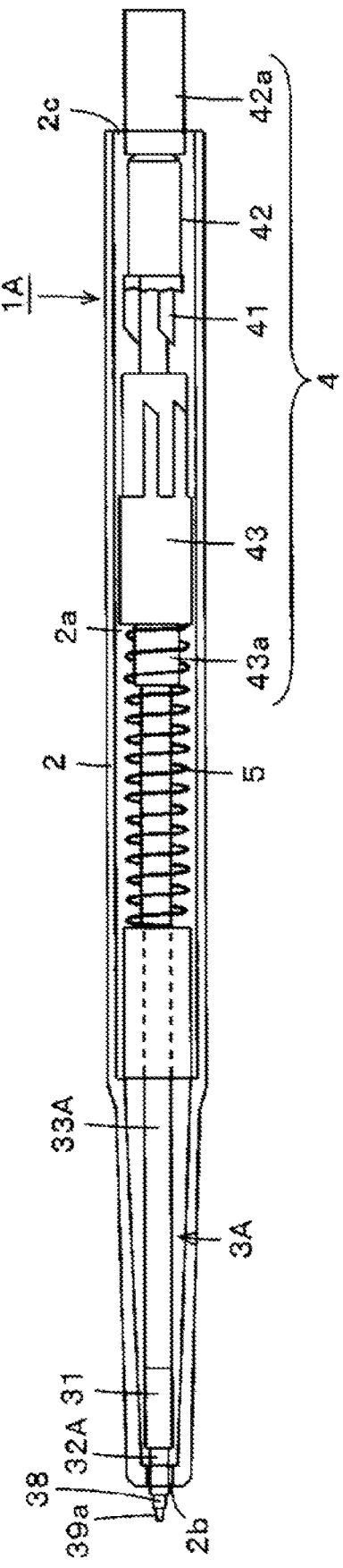

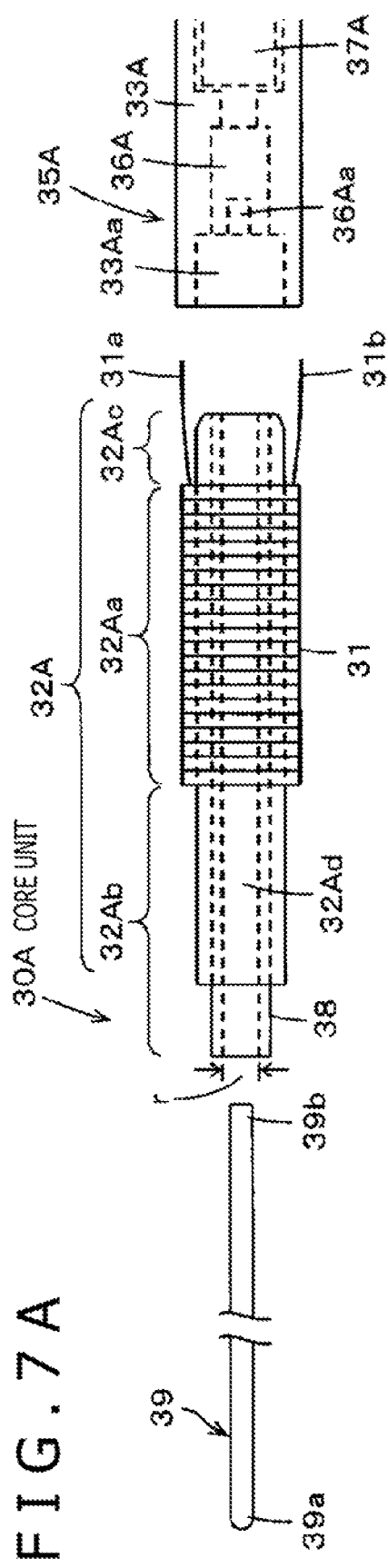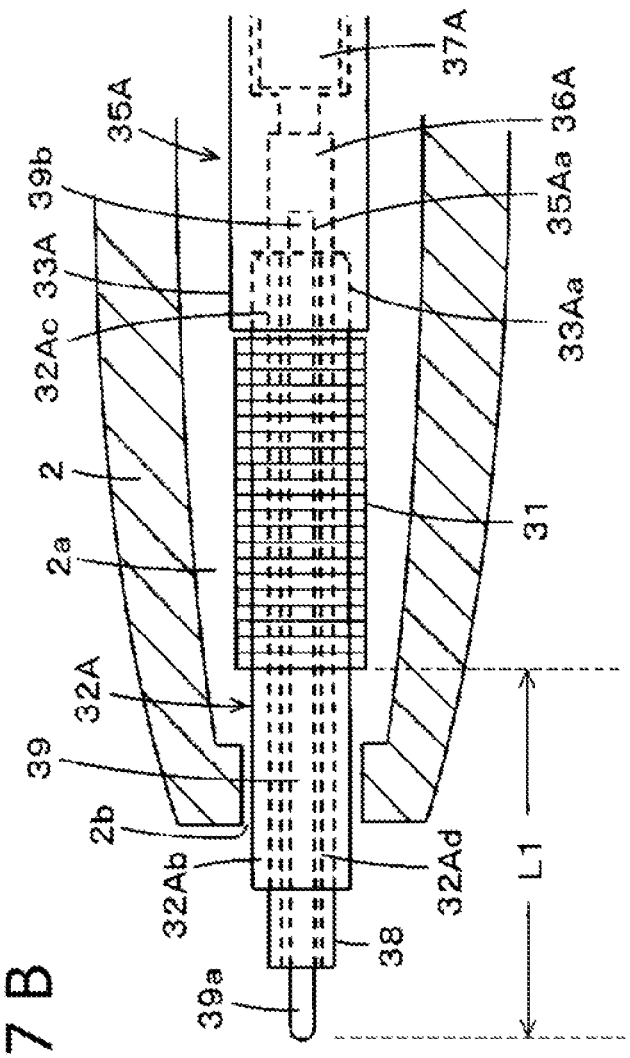
FIG. 7A
FIG. 7B

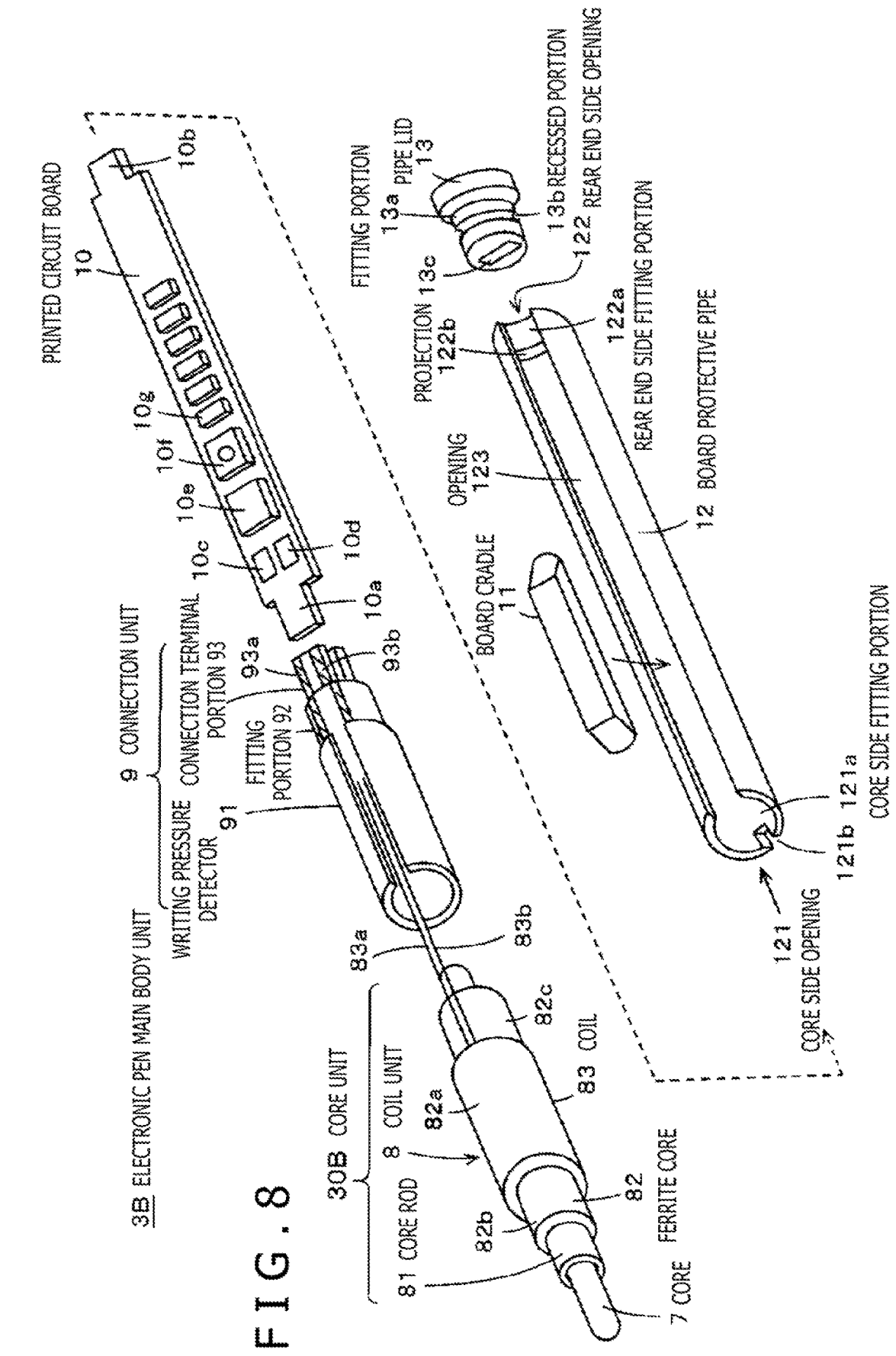

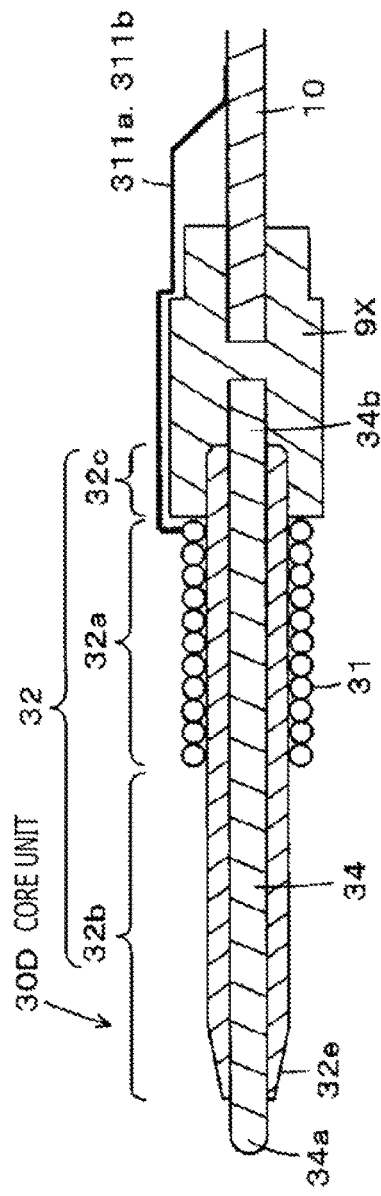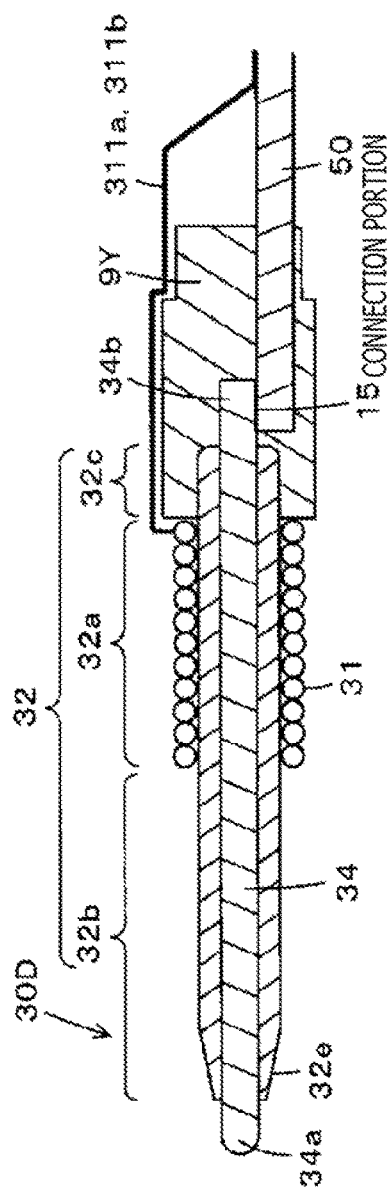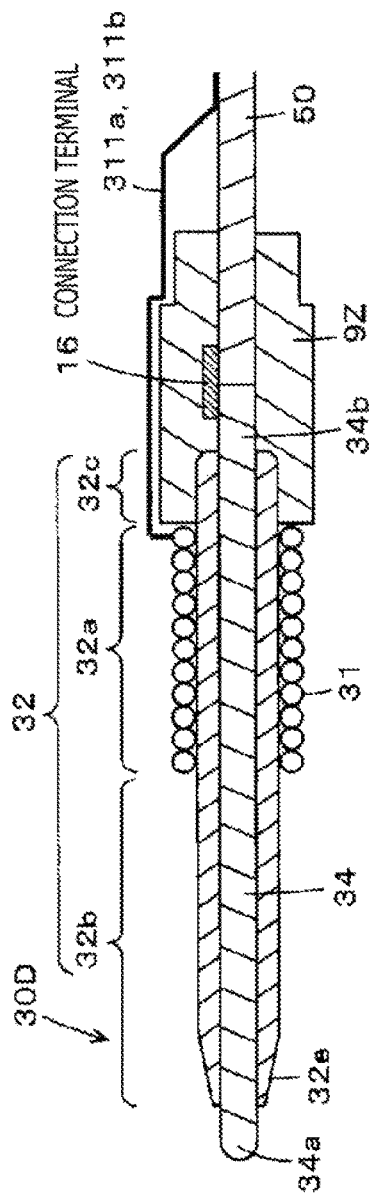

ELECTRONIC PEN AND ELECTRONIC PEN MAIN BODY UNIT

BACKGROUND

Technical Field

The present disclosure relates to an electronic pen that is a pen type position indicator used together with a position detection apparatus and an electronic pen main body unit for configuring the electronic pen.

Description of the Related Art

An electronic pen is gripped by a user and used for position indication on a sensor of a position detection apparatus. The position indicated on the sensor by the electronic pen is detected by the position detection apparatus through transmission and reception of a position detection signal between the electronic pen and the sensor by various coupling methods such as an electromagnetic induction coupling type or a capacitive coupling type. It is to be noted that an example of an inputting apparatus configured from a coordinate detection sensor and an electronic pen of the electromagnetic induction coupling type is disclosed in Patent Document 1 referred to later, and an example of an inputting apparatus configured from a coordinate detection sensor and an electronic pen of the capacitive coupling type is disclosed in Patent Document 2 referred to later.

PRIOR ART DOCUMENT

Patent Documents

Patent Document 1: Japanese Patent Laid-Open No. 1995-044304
Patent Document 2: Japanese Patent Laid-Open No. 1995-295722

BRIEF SUMMARY

Technical Problems

An electronic pen used together with a position detection apparatus of the electromagnetic induction coupling type or the capacitive coupling type is configured incorporating a circuit board and so forth therein. Therefore, a conventional electronic pen is thicker than common writing instruments such as, for example, a ballpoint pen or a fountain pen. However, together with reduction in size and thickness of an electronic apparatus in which a position detection apparatus is incorporated such as a so-called tablet personal computer (PC) or a high function mobile phone terminal called smartphone, it is demanded to make also an electronic pen thinner.

Corresponding to this, chipping of a capacitor (condenser), downsizing of a writing pressure detector and so forth on a circuit board built in an electronic pen are promoted, and also slimming down of an electronic is being advanced. However, together with slimming down of an electronic pen, also the thickness of an outer side housing of the electronic pen is decreasing, and there is a worry that the strength of the electronic pen may become so weak that the pen is liable to be bent or is liable to be broken. Especially, the pen tip side is a portion to which writing pressure is applied directly, and a technology for increasing the strength of an electronic pen that is to be slimmed down has become demanded.

Taking the foregoing into consideration, it is an object of the present disclosure to provide an electronic pen whose strength is increased such that, even if the electronic pen is slimmed down, especially the pen tip portion to which external pressure is likely to be applied is not bent or broken at all.

Technical Solution

In order to solve the above subjects, an electronic pen of the disclosure according to claim 1 includes a housing having an opening at an end thereof, a core unit, and a holding member having a cylindrical body and configured to hold the core unit in the cylindrical body on a side of the core unit opposite to a pen tip side of the core unit. The core unit is configured from a columnar magnetic core on which a coil is wound and a core rod fixed from a first end of the magnetic core to a second end of the magnetic core at a position including a center axis of the magnetic core and projecting at an end thereof from the first end of the magnetic core that is a pen tip side of the magnetic core. The magnetic core includes a first coil non-winding portion on which the coil is not wound provided on the pen tip side of the magnetic core. In operation, the end of the core rod and part of the first coil non-winding portion of the magnetic core project from the opening of the housing.

With the electronic pen of the disclosure according to claim 1, the electronic pen includes a housing, a core unit, and a holding member. The core unit is configured from the magnetic core on which the coil is wound and the core rod. The core rod is fixed from the first end of the magnetic core to the second end of the magnetic core at the position including the center axis of the magnetic core and projects at the end thereof from the first end of the magnetic core. Further, the first coil non-winding portion on which the coil is not wound is provided on the pen tip side of the magnetic core. Further, while the electronic pen is used, the end of the core rod and part of the first coil non-winding portion of the magnetic core project from the opening of the housing.

Since, at the position including the center axis of the magnetic core, the core rod is fixed from the first end to the second end (from end to end) of the magnetic core, the strength of the core unit can be made strong. Further, in operation, the end of the core rod projecting from the opening of the housing and the first coil non-winding portion of the magnetic core have a relationship in which they compensate for each other's strength. From those configurations, the strength of the core unit is made strong such that, also in operation, the pen tip portion configured from the core unit is prevented from being bent or broken.

Advantageous Effect

With the electronic pen of the present disclosure, an electronic pen in which, even if a high external pressure is applied to a portion of the pen tip side in operation, the portion of the pen tip side is not bent or broken can be implemented. In other words, an electronic pen whose strength is increased even if it is slimmed down can be implemented.

BRIEF DESCRIPTION OF THE DRAWINGS

FIGS. 1A and B illustrate views depicting an example of a configuration of an electronic pen according to a first embodiment of the present disclosure.

FIGS. 2A, 2B, and 2C illustrate views depicting an example of a configuration of an electronic pen main body unit according to the first embodiment of the present disclosure.

FIGS. 3A and 3B illustrate views depicting a configuration of a portion of an electronic pen main body unit according to the first embodiment of the present disclosure.

FIG. 4 is a view depicting a circuit configuration of the first embodiment of the electronic pen according to the present disclosure together with a circuit configuration of a position detection apparatus that is used together with the electronic pen.

FIGS. 5A and 5B illustrate views depicting an example of a configuration of an electronic pen according to a second embodiment of the present disclosure.

FIGS. 7A and 7B illustrate views depicting a configuration of a portion of an electronic pen main body unit according to the second embodiment of the present disclosure.

FIG. 8 illustrates a view depicting an example of a configuration of an electronic pen main body unit according to a third embodiment of the present disclosure.

FIGS. 16 A, 16B, and 16C illustrate views depicting an example of connection between a core rod and an electronic circuit on a printed circuit board.

MODES FOR CARRYING OUT THE DISCLOSURE

Figure 6A:
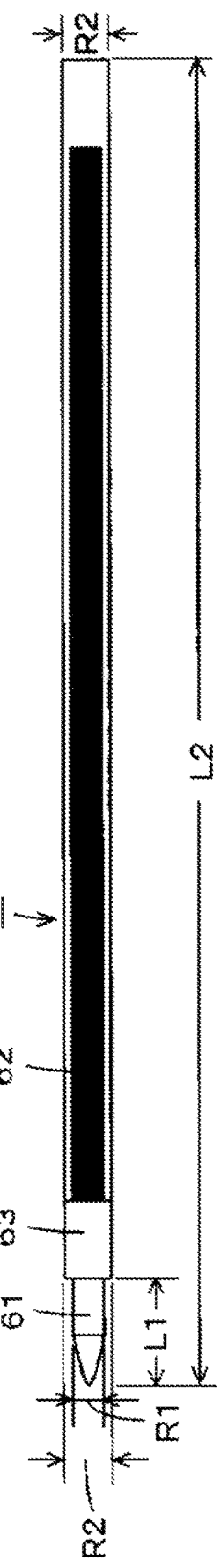
FIGS. 6A and 6B illustrate views depicting an example of a configuration of an electronic pen main body unit according to the second embodiment of the present disclosure.

In the following, embodiments of an electronic pen according to the present disclosure are described with reference to the figures. First, an embodiment in the case where the present disclosure is applied to an electronic pen of the electromagnetic induction coupling type is described.

First Embodiment

FIGS. 1A and B illustrate views depicting an example of a configuration of a first embodiment of an electronic pen according to the present disclosure. An electronic pen 1 of the present first embodiment has a knock type configuration in which an electronic pen main body unit 3 is accommodated in a hollow portion 2a of a tubular housing (housing of a pen) 2 and the pen tip side of the electronic pen main body unit 3 is moved into and out of an opening 2b at one end in a longitudinal direction of the housing 2 by a knock cam mechanism unit 4. In the present embodiment, the electronic pen main body unit 3 has a configuration of the cartridge type and is removable from the housing 2.

FIG. 1A depicts a state in which the electronic pen main body unit 3 is entirely accommodated in the hollow portion 2a of the housing 2, and FIG. 1B depicts a state in which the pen tip side of the electronic pen main body unit 3 projects from the opening 2b of the housing 2 by the knock cam mechanism unit 4. It is to be noted that, in the example of FIGS. 1A and 1B, the housing 2 of the electronic pen 1 is configured from transparent synthetic resin and is depicted in a state in which the inside thereof can be seen through the housing 2.

The electronic pen 1 of the present embodiment is configured such that it has compatibility with a knock type ballpoint pen on the market.

The housing 2 and the knock cam mechanism unit 4 provided in the housing 2 have a configuration which is the same as that of a well-known knock type ballpoint pen on the market and are also configured in a same dimensional relationship. In other words, as the housing 2 and the knock cam mechanism unit 4, a housing and a knock cam mechanism unit of a knock type ballpoint pen on the market can be used as they are.

As depicted in FIGS. 1A and 1B, the knock cam mechanism unit 4 has a well-known configuration in which a cam main body 41, a knock bar 42, and a rotor 43 are combined. The cam main body 41 is formed on an inner wall face of the tubular housing 2. The knock bar 42 is configured to project at an end portion 42a thereof from an opening 2c on the opposite side to the pen tip side of the housing 2 such that it can accept a knocking operation of a user. The rotor 43 includes a fitting portion 43a with which an end portion on the opposite side to the pen tip side of the electronic pen main body unit 3 is fitted.

If the end portion 42a of the knock bar 42 is depressed in a state of FIG. 1A, then the electronic pen main body unit 3 is locked to a state of FIG. 1B in the housing 2 by the knock cam mechanism unit 4 and indicates a state in which the pen tip side of the electronic pen main body unit 3 projects from the opening 2b of the housing 2. Then, if the end portion 42a of the knock bar 42 is depressed again in the state of FIG. 1B, then the locking state is canceled by the knock cam mechanism unit 4 and the position of the electronic pen main body unit 3 in the housing 2 returns to the state of FIG. 1A by a return spring 5. Since a detailed configuration and operation of the knock cam mechanism unit 4 are well known, description of them is omitted here.

<Example of Configuration of Electronic Pen Main Body Unit 3>

FIGS. 2A, 2B, and 2C illustrate views depicting an example of a configuration of the electronic pen main body unit 3 in comparison with a replacement core of a knock type ballpoint pen on the market. In particular, FIG. 2A depicts a replacement core 6 of a knock type ballpoint pen on the market. Meanwhile, FIG. 2B depicts an example of a configuration of the electronic pen main body unit 3 of the present embodiment. Further, FIG. 2C is a view illustrating a configuration of a part of the electronic pen main body unit 3 of the present embodiment depicted in FIG. 2B. Meanwhile, FIGS. 3A and 3B illustrate views depicting a configuration of a portion on the pen tip side of the electronic pen main body unit 3.

The replacement core 6 of a knock type ballpoint pen on the market has a well-known configuration in which a pen tip unit 61 having a ball disposed at a tip end thereof and an ink accommodation unit 62 are coupled integrally by a coupling unit 63 as depicted in FIG. 2A. The coupling unit 63 has a diameter equal to that of the ink accommodation unit 62.

Meanwhile, in the electronic pen main body unit 3 of the present embodiment, a magnetic core on which a coil 31 is wound, in the present example, a ferrite core 32, is coupled to a tubular body unit 33 as depicted in FIG. 2B. It is to be noted that, although details are hereinafter descried, the tubular body unit 33 is configured from a first tubular body unit 331 on which an electronic circuit part is disposed and a second tubular body unit 332 on which a writing pressure detector is disposed.

First, a configuration of the core unit 30 that is a portion on the pen tip side of the electronic pen main body unit 3 is described with reference to FIGS. 3A and 3B. The core unit 30 is configured from the ferrite core 32 on which the coil 31 is wound and a core rod 34. FIG. 3A is an exploded enlarged view of the ferrite core 32 on which the coil 31 are wound, the core rod 34, and a portion of part of the first tubular body unit 331 and is a view illustrating a configuration of the core unit 30.

In the ferrite core 32 of this example, a through-hole 32d in an axial direction having a predetermined diameter (for example, the diameter=1 mm) for fitting and fixing the core rod 34 that is a solid body is formed at a position including the center line in the axial direction, for example, in a ferrite material of a cylindrical shape. The core rod 34 is inserted in the through-hole 32d, and the core rod 34 is fitted and fixed from one end to the other end of the ferrite core 32.

In particular, at a position including the center line (axis) of the ferrite core 32, the core rod 34 is inserted and fixed (attached fixedly) such that it fits closely in the through-hole 32d of the ferrite core 32. Consequently, even if the ferrite core 32 itself becomes thin by slimming down of the electronic pen, the strength of the core unit 30 that is a portion on the pen tip side can be made strong by the presence of the core rod 34. Then, the core rod 34 projects at one end portion 34a (hereinafter referred to as end portion 34a) thereof as the pen tip from one end of the ferrite core 32 as depicted in FIG. 2B.

It is to be noted that, in the present embodiment, the core rod 34 is formed from SUS (stainless steel). Preferably, SUS304 or SUS316 is used to form the core rod 34. This is because, as the content ratio of nickel increases, the ease of magnetization decreases. Further, the ferrite core 32 and the core rod 34 may be fixed to each other such that a bonding agent is interposed between them. Further, the description of the core rod 34 that is a solid body is that the core rod 34 is not of a form of a pipe but has a configuration that it is full of contents or at least the end portion 34a is closed.

Further, the core rod 34 may be configured from a metal material other than SUS or a ceramic (ceramic). Further, the core rod 34 may be configured using a material such as carbon resin, reinforced plastic or the like having a strength equal to that of metal such as SUS.

Further, a tapered portion 32e that gradually tapers is formed on the pen tip side of the ferrite core 32. By the tapered portion 32e, magnetic flaxes that pass the ferrite core 32 become high in concentration at the tapered portion 32e, and magnetic coupling with a sensor of a position detection apparatus can be increased in comparison with that in an alternative case in which the tapered portion 32e is not provided.

Further, in the present embodiment, the coil 31 is not wound over an overall length in the axial direction of the ferrite core 32 but is wound partially as depicted in FIG. 3A. In particular, in this example, the coil 31 has a winding length of an approximately one half the overall length of the ferrite core 32, and as depicted in FIG. 3A, a coil winding portion 32a of the ferrite core 32 of the coil is positioned so as to be displaced to the coupling portion side of the ferrite core 32 to the tubular body unit 33.

Thus, when the ferrite core 32 is viewed in its axial direction, a portion thereof from an end portion on the pen tip side to one end of the coil winding portion 32a is a first coil non-winding portion 32b on which no coil is wound, and a small portion on the coupling portion side of the ferrite core 32 to the tubular body unit 33 from the other end of the coil winding portion 32a is a second coil non-winding portion 32c on which the coil 31 is not wound. The length in the axial direction of the second coil non-winding portion 32c is a small length for coupling to the first tubular body unit 331. Meanwhile, the length in the axial direction of the first coil non-winding portion 32b is, in the present example, a comparatively great length that is the difference of the length of the second coil non-winding portion 32c from approximately one half the overall length of the ferrite core 32.

Further, as depicted in FIGS. 3A and 3B, the entirety or part of the second coil non-winding portion 32c of the ferrite core 32 is fitted with an end portion 33a of the first tubular body unit 331 to couple the ferrite core 32 to the first tubular body unit 331. It is to be noted that, although not depicted in FIGS. 3A and 3B, upon coupling of the ferrite core 32 to the first tubular body unit 331, the ends 31a and 31b of the coil 31 are electrically connected to each other such that they are connected in parallel to a capacitor provided on a printed board (circuit board) of the tubular body unit 33. In this manner, the core unit 30 whose portion in the pen tip side is configured from the ferrite core 32 on which the coil 31 is wound and the core rod 34.

Now, a general configuration of the electronic pen main body unit 3 is described principally with reference to FIGS. 2A, 2B, and 2C. In the case of the present example, as depicted in FIG. 2A and FIG. 2B, the pen tip side of the electronic pen main body unit 3 is configured such that the dimension thereof is substantially equal to the dimension of the pen tip side of the replacement core 6 of a ballpoint pen. In particular, the diameter of the ferrite core 32 provided on the pen tip side of the electronic pen main body unit 3 is configured so as to be substantially equal to a diameter R1 of the pen tip unit 61 of the replacement core 6 of a ballpoint pen. Further, the total length of the length of a portion of the end portion 34a of the core rod 34 projecting rom the ferrite core 32 and the length of the first coil non-winding portion 32b of the ferrite core 32 is configured so as to be substantially equal to a length L1 of the pen tip unit 61 of the replacement core 6 of a ballpoint pen as depicted in FIGS. 2A and 2B and FIG. 3B.

Further, the diameter of the coil winding portion 32a on which the coil 31 of the ferrite core 32 of the electronic pen main body unit 3 is wound and the diameter of the tubular body unit 33 are substantially equal to a diameter R2 of the ink accommodation unit 62 of the replacement core 6 of a ballpoint pen but is greater than the diameter R1 of the pen tip unit 61 (R2>R1). It is to be noted that the diameter of the opening 2b of the housing 2 is smaller than the diameter R2.

Accordingly, the coil winding portion 32a cannot project from the opening 2b to the outside.

Further, as described hereinabove and depicted in FIG. 2B, the tubular body unit 33 is configured from the first tubular body unit 331 on which an electronic circuit part is disposed and the second tubular body unit 332 on which a writing pressure detector is disposed. In the present embodiment, as depicted in FIGS. 2A and 2B, the length (overall length) in the state in which the core unit 30 configured from the core rod 34 and the ferrite core 32 on which the coil 31 is wound and the tubular body unit 33 are coupled to each other is selected so as to be equal to an overall length L2 of the replacement core 6 of the ballpoint pen.

As depicted in FIG. 2C, a printed circuit board 37 is disposed in the first tubular body unit 331 of the tubular body unit 33, and a circuit part 37A including a capacitor (condenser) that configures a resonance circuit together with the coil 31 is provided on the printed circuit board 37.

Further, the core unit 30 configured from the core rod 34 and the ferrite core 32 on which the coil 31 is wound and the first tubular body unit 331 of the tubular body unit 33 are coupled to each other and configured integrally such that, for example, part of the ferrite core 32 on the opposite side to the pen tip side is inserted in the first tubular body unit 331. In this case, upon coupling between the core unit 30 and the first tubular body unit 331 of the tubular body unit 33, a winding starting end 31a and a winding ending end 31b of the coil 31 are electrically connected to one end and the other end of a capacitor in the circuit part 37A provided on the printed circuit board 37 in the first tubular body unit 331.

It is to be noted that, in FIG. 2C, that the winding starting end 31a and the winding ending end 31b of the coil 31 are connected to the one end and the other end of the capacitor in the circuit part 37A is depicted in a simplified form. Actually, the winding starting end 31a and the winding ending end 31b of the coil 31 are connected to the capacitor in the circuit part 37A, which is positioned in the inside of the first tubular body unit 331, passing between the ferrite core 32 and the first tubular body unit 331.

Further, although also the diameter of the tubular body unit 33 is substantially equal to the diameter R2 of the ink accommodation unit 62 of the replacement core 6 of a ballpoint pen, in the example of FIG. 2B, the diameter of the first tubular body unit 331 is a little greater than the diameter R2 described hereinabove. However, since this portion of the first tubular body unit 331 is positioned, when it is accommodated in the housing of a ballpoint pen, at a position at which some room exists with respect to the replacement core 6 in the hollow portion of the tubular housing, there is no problem with such a diameter as described above.

The second tubular body unit 332 is configured, in the present example, from a tubular body having a diameter equal to the diameter R2 of the ink accommodation unit 62 of the replacement core 6 of a ballpoint pen on the market. In the example of FIGS. 2A, 2B, and 2C, the second tubular body unit 332 is divided into two of a long part 332a and a short part 332b, and in the present example, a writing pressure detector 36 is provided in the proximity of the coupling portion 35 between the long part 332a and the short part 332b.

In particular, as depicted in FIG. 2C, in the present example, the long part 332a and the short part 332b are coupled to each other through the connection bar member 351 and the coil spring 352 at the coupling portion 35. In this case, although the long part 332a and the short part 332b are normally urged elastically by the coil spring 352 such that they spaced away from each other in the axial direction, they are configured so as to be stopped at a predetermined position by the connection bar member 351 and are not displaced in the axial direction any more. Then, the position indicator cartridge 3 is configured such that the overall length thereof in the stopped state is equal to the overall length L2 of the replacement core 6 of a ballpoint pen described hereinabove.

Further, as depicted in FIG. 2C, in the present embodiment, the writing pressure detector 36 is provided on the long part 332a. Further, a one end 351a side of the connection bar member 351 is configured so as to act as a pressing portion of the writing pressure detector 36.

The writing pressure detector 36 of the present example can be configured as a variable capacitor whose capacitance varies in response to the writing pressure and in which writing pressure detection means of a well-known configuration described, for example, in a patent document: Japanese Patent Laid-Open No. 2011-186803 is used. It is to be noted that also it is possible to configure the writing pressure detector 36 using such a semiconductor element whose capacitance varies in response to the writing pressure as disclosed, for example, in Japanese Patent Laid-Open No. 2013-161307.

If pressure is applied to the core unit 30 configured from the core rod 34 and the ferrite core 32 on which the coil 31 is wound in a state in which the electronic pen main body unit 3 is accommodated in the housing 2, then force tending to move the entire long part 332a side of the electronic pen main body unit 3 toward the short part 332b side against the elastic force of the coil spring 352 acts, and the capacitance of the writing pressure detector 36 indicates a value according to the writing pressure.

By fitting the tubular body unit 33 of the electronic pen main body unit 3 having such a configuration as described above with the fitting portion 43a of the rotor 43 of the knock cam mechanism unit 4, the electronic pen main body unit 3 can be accommodated into the housing 2. Then, in the electronic pen 1 of the present embodiment, when a user uses it together with a position detection apparatus, the user would depress the end portion 42a of the knock bar 42. Consequently, as depicted in FIGS. 1A and 3B, the electronic pen 1 enters a state in which the end portion 34a of the core rod 34 and part of the first coil non-winding portion 32b of the ferrite core 32 project from the opening 2b of the housing 2. In this state, the user of the electronic pen 1 would perform an inputting operation of an indication position on the sensor of the position detection apparatus.

If the use of the electronic pen 1 ends, then by depressing the end portion 42a of the knock bar 42 again, the electronic pen main body unit 3 can be placed into a state in which it is entirely accommodated in the hollow portion 2a of the housing 2 as depicted in FIG. 1A. At this time, the entirety of the electronic pen main body unit 3 is accommodated in the hollow portion 2a of the housing 2 and the end portion 34a of the core rod 34 of the electronic pen main body unit 3 is placed in a state in which it is protected by the housing 2.

<Circuit Configuration for Position Detection and Writing Pressure Detection of Position Detection Apparatus of Electromagnetic Induction Type>

Now, an example of a circuit configuration and operation of a position detection apparatus 400 that performs detection of an indication position by the electronic pen 1 of the embodiment described above and detection of writing pressure applied to the electronic pen 1 are described with reference to FIG. 4.

As depicted in FIG. 4, the electronic pen 1 includes a resonance circuit in which the coil 31 as an inductance element, a variable capacitor Cv configured from the writing pressure detector 36, and a resonance capacitor Cf included in the circuit part 37A positioned in the inside of the first tubular body unit 331 are connected in parallel.

Meanwhile, in the position detection apparatus 400, an X-axis direction loop coil group 411 and a Y-axis direction loop coil group 412 are layered to form a position detection coil 410. The loop coil groups 411 and 412 are configured, for example, from n and m rectangular loop coils, respectively. The loop coils configuring the loop coil groups 411 and 412 are disposed such that they are lined up at equal distances and successively overlap with each other.

Further, in the position detection apparatus 400, a selection circuit 413 to which the X-axis direction loop coil group 411 and the Y-axis direction loop coil group 412 are connected is provided. The selection circuit 413 successively selects the loop coils of one of the two loop coil groups 411 and 412.

Furthermore, in the position detection apparatus 400, an oscillator 421, a current driver 422, a switching connection circuit 423, a reception amplifier 424, a detector 425, a low pass filter 426, a sample and hold circuit 427, an analog to digital (A/D) conversion circuit 428, a synchronous detector 429, another low pass filter 430, another sample and hold circuit 431, another A/D conversion circuit 432, and a process control circuit 433 are provided. The process control circuit 433 is configured from a microcomputer.

The oscillator 421 generates an alternating current (AC) signal of a frequency f0. Then, the oscillator 421 supplies the generated AC signal to the current driver 422 and the synchronous detector 429. The current driver 422 converts the AC signal supplied thereto from the oscillator 421 into current and sends out the current to the switching connection circuit 423. The switching connection circuit 423 switches a connection destination (transmission side terminal T, reception side terminal R) to which the loop coil selected by the selection circuit 413 is to be connected under the control of the process control circuit 433. To the transmission side terminal T from between the connection destinations, the current driver 422 is connected, and to the reception side terminal R, the reception amplifier 424 is connected.

An induced voltage generated in the loop coil selected by the selection circuit 413 is sent to the reception amplifier 424 through the selection circuit 413 and the switching connection circuit 423. The reception amplifier 424 amplifies the induced voltage supplied thereto from the loop coil and sends out the amplified induced voltage to the detector 425 and the synchronous detector 429.

The detector 425 detects the induced voltage generated in the loop coil, namely, a reception signal, and sends out the detected reception signal to the low pass filter 426. The low pass filter 426 has a cutoff frequency sufficiently lower than the frequency f0 described above, and converts the output signal of the detector 425 into a direct current (DC) signal and sends out the DC signal to the sample and hold circuit 427. The sample and hold circuit 427 holds a voltage value of the output signal of the low pass filter 426 at a predetermined timing, in particular, at a predetermined timing during a reception period, and sends out the retained voltage value to the A/D conversion circuit 428. The A/D conversion circuit 428 converts an analog output of the sample and hold circuit 427 into a digital signal and outputs the digital signal to the process control circuit 433.

On the other hand, the synchronous detector 429 performs synchronous detection of the output signal of the reception amplifier 424 with the AC signal from the oscillator 421 and sends out a signal of a level according to a phase difference between them to the low pass filter 430. The low pass filter 430 has a cutoff frequency sufficiently lower than the frequency f0, and converts the output signal of the synchronous detector 429 into a DC signal and sends out the DC signal to the sample and hold circuit 431. The sample and hold circuit 431 holds a voltage value of the output signal of the low pass filter 430 at a predetermined timing and sends out the voltage value to the A/D conversion circuit 432. The A/D conversion circuit 432 converts an analog output of the sample and hold circuit 431 into a digital signal and outputs the digital signal to the process control circuit 433.

The process control circuit 433 controls the components of the position detection apparatus 400. In particular, the process control circuit 433 controls selection of a loop coil by the selection circuit 413, switching of the switching connection circuit 423, and timings of the sample and hold circuits 427 and 431. The process control circuit 433 controls the X-axis direction loop coil group 411 and the Y-axis direction loop coil group 412 to transmit radio waves with a fixed transmission duration (continuous transmission period) on the basis of input signals from the A/D conversion circuits 428 and 432.

In each of the loop coils of the X-axis direction loop coil group 411 and the Y-axis direction loop coil group 412, an induced voltage is generated by radio waves transmitted (fed back) from the electronic pen 1. The process control circuit 433 calculates coordinate values of an indication position of the electronic pen 1 in the X-axis direction and the Y-axis direction on the basis of the levels of the voltage values of the induced values generated in the loop coils. Further, the process control circuit 433 detects writing pressure on the basis of the level of a signal according to a phase difference between the transmitted radio waves and the received radio waves.

In this manner, in the position detection apparatus 400, the position of the approaching electronic pen 1 is detected by the process control circuit 433. Then, by detecting the phase of the received signal, the position detection apparatus 400 acquires information of the writing pressure value of the electronic pen 1.

Then, since slimming down of the electronic pen main body unit 3 can be implemented, the electronic pen main body unit 3 can be configured such that it is compatible with the replacement core of a ballpoint pen on the market.

Where the electronic pen main body unit 3 is configured such that it is compatible with the replacement core of a ballpoint pen on the market, there is a merit that the housing of a ballpoint pen on the market can be diverted to the housing 2 of the electronic pen 1. In other words, the electronic pen 1 can be configured by accommodating the electronic pen main body unit 3 of the present embodiment in place of the replacement core of a ballpoint pen into the housing of a ballpoint pen.

Then, even if the electronic pen main body unit 3 is slimmed down equally to the replacement core of a ballpoint pen, or even in the case where the electronic pen main body unit 3 is slimmed down further, the ferrite core 32 and the core rod 34 are fitted with and fixed to each other to configure the core unit 30. Consequently, the electronic pen main body unit 3 in which the strength of the core unit 30 to which writing pressure is applied directly is increased and whose strength is made high as a whole against an external pressure even if it is slimmed down can be implemented.

Second Embodiment

Now, an electronic pen of a second embodiment is described. In the first embodiment described above, the core rod 34 that is a solid body is fitted and fixed to a position that includes the center line (axis) in an axial direction of the ferrite core 32. In the present second embodiment, a core rod having a configuration of a hollow pipe (a core of a pipe shape) is fitted and fixed to a position including the center line in an axial direction of a ferrite core. Then, a core body of a solid body is disposed such that it is slidably movable in the axial direction in the hollow in the axial direction of the core rod of a pipe shape to configure a core unit that is a portion on the pen tip side.

Therefore, in the case of the electronic pen of the present second embodiment, a core body of a solid body that is slidably movable in the axial direction in the core rod configured as a hollow pipe is configured so as to act directly upon a writing pressure detector. Except the portion on the pen tip side (core body portion) and the portion of the writing pressure detector, the electronic pen 1 is configured basically similarly to the electronic pen 1 of the first embodiment described hereinabove with reference to FIGS. 1 to 3. Therefore, in the drawings illustrating the electronic pen of the second embodiment, portions configured similarly to those of the electronic pen 1 of the first embodiment are denoted by like reference symbols, and since description of the portions overlaps, it is omitted.

FIGS. 5A and 5B illustrate views depicting an example of a configuration of the second embodiment of the electronic pen according to the present disclosure. Also in the case of the electronic pen 1A of the present second embodiment, it has a configuration of the knock type in which an electronic pen main body unit 3A is accommodated in the hollow portion 2a of the tubular housing 2 and the pen tip side of the electronic pen main body unit 3 is moved into and out of the opening 2b side at one end in the longitudinal direction of the housing 2 by the knock cam mechanism unit 4. Also in the present second embodiment, the electronic pen main body unit 3A has a configuration of the cartridge type and is removable from the housing 2.

FIG. 5A depicts a state in which the electronic pen main body unit 3A is entirely accommodated in the hollow portion 2a of the housing 2, and FIG. 5B depicts a state in which the pen tip side of the electronic pen main body unit 3A is projected from the opening 2b of the housing 2 by the knock cam mechanism unit 4. It is to be noted that, also in the example of FIGS. 5A and 5B, the housing 2 of the electronic pen 1A is configured from a transparent synthetic resin and is depicted in a state in which the inside of the same can be seen through the same. Also the electronic pen 1A of the present second embodiment is configured such that it has compatibility with a knock type ballpoint pen on the market.

The housing 2 and the knock cam mechanism unit 4 provided in the housing 2 have a configuration and a dimensional relationship same as those of a well-known knock type ballpoint pen on the market similarly as in the case of the electronic pen 1 of the first embodiment. Further, also in the electronic pen 1A of the present second embodiment, a non-used state (state depicted in FIG. 5A) and a used state (state depicted in FIG. 5B) can be switched in response to a depression operation of the end portion 42a of the knock bar 42 by the function of the knock cam mechanism unit 4.

<Example of Configuration of Electronic Pen Main Body Unit 3A>

Figure 6B:
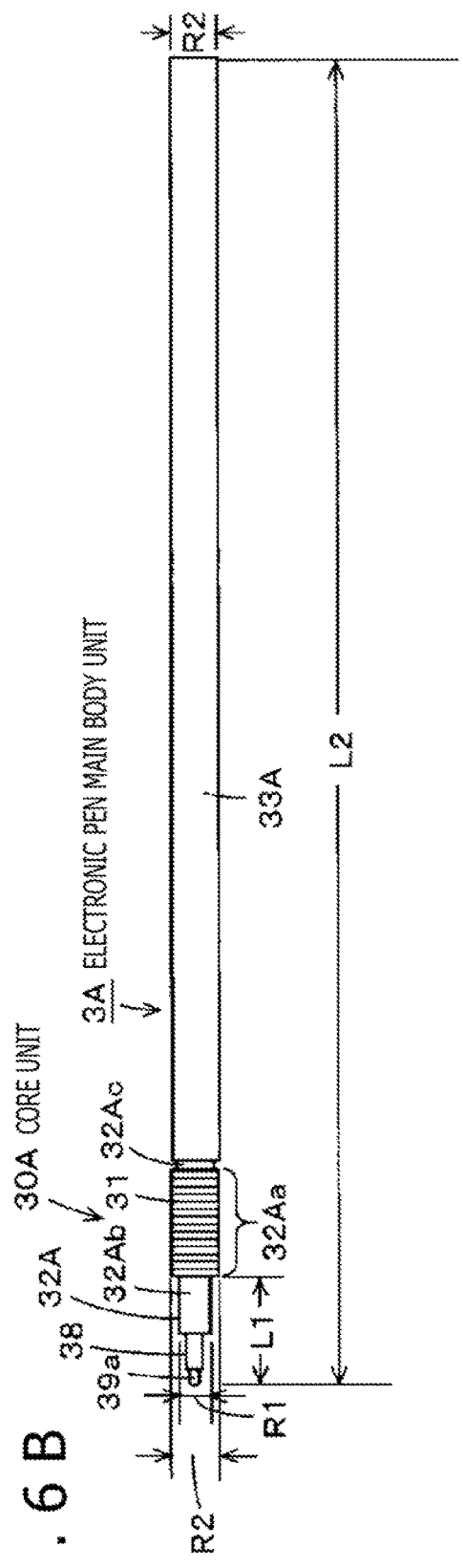

FIGS. 6A and 6B illustrate views depicting an example of a configuration of the electronic pen main body unit 3A of the second embodiment in comparison with the replacement core of a knock type ballpoint pen on the market. In particular, FIG. 6A depicts the replacement core 6 of a knock type ballpoint pen on the market similarly to FIG. 2A, and FIG. 6B depicts an example of a configuration of the electronic pen main body unit 3A of the present second embodiment. Further, FIGS. 7A and 7B illustrate views depicting a configuration of a portion on the pen tip side of the electronic pen main body unit 3A of the second embodiment.

In the electronic pen main body unit 3A of the present second embodiment, a magnetic core on which the coil 31 is wound, in the present example, a ferrite core 32A, is coupled to a tubular body unit 33A as depicted in FIG. 6B. Then, although hereinafter described in detail, a core rod 38 having a configuration of a hollow pipe is fitted and fixed to a position including the center line (axis) in an axial direction of the ferrite core 32A. In particular, in the electronic pen main body unit 3A of the present second embodiment, the core rod 38 having a configuration of a hollow pipe is used in place of the core rod 34 that is a solid body used in the electronic pen main body unit 3 of the first embodiment. In other words, the core rod 38 is that of a pipe shape that has a through-hole.

Accordingly, at a position including the center line of the ferrite core 32A, the core rod 38 of a pipe shape is inserted in and fixed (attached fixedly) to the through-hole 32d of the ferrite core 32A such that it closely fits with the through-hole 32d of the ferrite core 32A. Consequently, even if the ferrite core 32A itself becomes thin by slimming down of the electronic pen, the strength of the ferrite core 32A and peripheral portions can be made strong by the presence of the core rod 38 of a pipe shape. Then, in the electronic pen main body unit 3A of the present second embodiment, a core 39 is inserted in the follow portion (through-hole) of the core rod of a pipe shape, and one end of the core 39 projects from the core rod 38 of a pipe shape to configure a pen tip while the other end is fitted with a writing pressure detector hereinafter described.

In this manner, in the electronic pen main body unit 3A of the present second embodiment, the ferrite core 32 on which the coil 31 is wound, the core rod 38 of a pipe shape, and the core 39 accommodated in the hollow portion of the core rod 38 of a pipe shape configure the core unit 30A. The core unit 30A becomes a portion on the pen tip side of the electronic pen main body unit 3A of the second embodiment.

It is to be noted that, also in the present second embodiment, similarly as in the case of the core rod 34 of the first embodiment, the core rod 38 of a pipe shape is formed from SUS (stainless steel), and preferably is formed using SUS304 or SUS316. Further, the ferrite core 32A and the core rod 38 of a pipe shape may be fixedly attached to each other such that a bonding agent is interposed between them.

Further, the core 39 may be formed from SUS similarly to the core rod 38 and can be formed also from various other conductive materials. For example, also it is possible to configure the core rod 38 from resin in which, for example, metal or carbon is mixed so as to have conductivity. Also it is possible to configure the core 39 as a non-conductive bar-like member. In particular, also it is possible to configure the core 39 from a resin material that is comparatively hard and has elasticity, for example, from polyoxymethylene (POM) or the like. Further, the core rod 38 may be configured from a metal material other than SUS or ceramic. Further, the core rod 34 may be configured using a carbon resin or a material such as reinforced plastic having a strength equal to that of metal such as SUS. Also the core 39 may be configured from ceramic.

Further, in the case of the tubular body unit 33 of the electronic pen main body unit 3 of the first embodiment described above, it is configured from the first tubular body unit 331 on which an electronic circuit part is disposed and the second tubular body unit 332 on which a writing pressure detector is disposed. In contrast, the tubular body unit 33A of the present second embodiment is formed as one tubular body unit as a whole because a writing pressure detector is to be disposed on the pen tip side as hereinafter described.

Now, a configuration of the core unit 30A that is a portion on the pen tip side of the electronic pen main body unit 3A of the second embodiment is described particularly with reference to FIGS. 7A and 7B. As described hereinabove, the core unit 30A is configured from the ferrite core 32 on which the coil 31 is wound, the core rod 38 of a pipe shape, and the core 39. FIG. 7A is an exploded enlarged view of the ferrite core 32 on which the coil 31 is wound, the core rod 38, the core 39, and a portion of part of the tubular body unit 33A and is a view illustrating a configuration of the core unit 30A.

In the ferrite core 32A of this example, a through-hole 32Ad in the axial direction having a predetermined diameter (for example, the diameter=1 mm) in which the core rod 38 of a pipe shape is to be inserted is formed, for example, in a ferrite material of a cylindrical shape.

Thus, also in the present second embodiment, the coil 31 is wound not over the overall length in the axial direction of the ferrite core 32A but is wound partially as depicted in FIG. 7A. In particular, in this example, the coil 31 has a winding length of approximately one half of the overall length of the ferrite core 32A, and the coil winding portion 32Aa of the ferrite core 32A of the coil is positioned in a displaced relationship to the coupling portion side of the ferrite core 32A to the tubular body unit 33A.

Further, a portion from an end portion of the pen tip side to one end of the coil winding portion 32Aa when the ferrite core 32A is viewed in its axial direction is a first coil non-winding portion 32Ab on which no coil is wound, and also some portion on the coupling portion of the ferrite core 32A to the tubular body unit 33A from the other end of the coil winding portion 32Aa is a second coil non-winding portion 32Ac on which the coil 31 is not wound. The length in the axial direction of the second coil non-winding portion 32Ac is a small length for coupling to the tubular body unit 33A. On the other hand, the length in the axial direction of the first coil non-winding portion 32Ab is, in the present example, a comparatively great length that is the difference of the length of the second coil non-winding portion 32Ac from approximately one half of the overall length of the ferrite core 32A.

Further, as described hereinabove and depicted in FIGS. 7A and 7B, to the through-hole 32Ad in the axial direction of the ferrite core 32A, a core rod 38 of a pipe shape that fits with the through-hole 32Ad is inserted and is fitted and fixed. In particular, the diameter of the through-hole of the ferrite core 32A is a little greater than the outer diameter of the core rod 38 of a pipe shape, and at a position including the center line in the axial direction of the ferrite core 32A, the core rod 38 of a pipe shape is fixed over a portion from one end to the other end of the ferrite core 32. It is to be noted that, in the case of the present example, the core rod 38 partially projects from the end on the pen tip side of the ferrite core 32A as depicted in FIGS. 7A and 7B.

Furthermore, the core 39 is fitted in the hollow portion (through-hole) of the core rod 38 of a pipe shape fitted with and fixed to the ferrite core 32A on which the coil 31 is wound. The diameter of the core 39 is smaller than an inner diameter r of the core rod 38 as depicted in FIG. 7A such that the core 39 can slidably move in the axial direction in the core rod 38. In this manner, the core unit 30A that is a portion of the pen tip side of the electronic pen main body unit 3A of the second embodiment is configured from the coil 31, the ferrite core 32A, the core rod 38 of a pipe shape, and the core 39.

Further, in the present embodiment, a writing pressure detector 36A is provided in the proximity of a coupling unit 35A of the tubular body unit 33A to the ferrite core 32A. Also the writing pressure detector 36A is configured similarly to the writing pressure detector 36 of the electronic pen main body unit 3 of the first embodiment and has a configuration of a variable capacitor whose capacitance varies, for example, in response to the writing pressure. It is to be noted that also it is possible to configure the writing pressure detector 36A using a semiconductor element whose capacitance is variable in response to the writing pressure.

Further, a printed circuit board 37A is accommodated in the tubular body unit 33A. On the printed circuit board 37A, a capacitor that is connected in parallel to the coil 31 to configure a resonance circuit is provided. Further, the variable capacitor configured from the writing pressure detector 36A is connected in parallel to a capacitor formed on the printed circuit board 37A and configures part of the resonance circuit. This configuration is similar to the configuration of the electronic pen 1 depicted in FIG. 4 used in the description of the first embodiment.

Further, the second coil non-winding portion 32Ac of the ferrite core 32A is entirely or partly fitted in a recessed portion 33Aa provided on the tubular body unit 33A such that the ferrite core 32A is coupled to the tubular body unit 33A as depicted in FIG. 7B. Though not depicted, upon coupling to the tubular body unit 33A of the ferrite core 32A, the ends 31a and 31b of the coil 31 are electrically connected such that the coil 31 is connected in parallel to a capacitor provided on the printed circuit board 37A of the tubular body unit 33A.

Further, as depicted in FIG. 7A, in a state in which the ferrite core 32A to which the core rod 38 of a pipe shape is fixed attached and the tubular body unit 33A are coupled to each other, the core 39 is inserted into the hollow portion (through-hole) of the core rod 38. In this case, a tip end portion 39a of the core 39 projects from the end on the pen tip side of the core rod 38 while an end portion 39b on the opposite side to the tip end portion 39a is fitted with a fitting portion 36Aa of the writing pressure detector 36A in the tubular body unit 33A.

Further, although a particular illustration is omitted, an elastic material such as, for example, rubber is disposed in the fitting portion 36Aa of the writing pressure detector 36A such that the end portion 39b of the core 39 is held by the elastic member to prevent the core 39 from being pulled out readily. However, if the user applies force so as to pull out the core 39, then the fitting between the core 39 and the fitting portion 36Aa of the writing pressure detector 36A is canceled readily and the core 39 can be pulled out. In other words, the core 39 is exchangeable.

Also in the present second embodiment, as depicted in FIGS. 6A and 6B, the dimensions L1, R1, and R2 on the pen tip side of the electronic pen main body unit 3A are configured so as to be substantially equal to the dimensions L1, R1, and R2 of the pen tip side of the replacement core 6 of a ballpoint pen, respectively. Further, the overall length L2 of the electronic pen main body unit 3A is configured so as to be substantially equal also to the overall length L2 of the replacement core 6 of a ballpoint pen.

Also in the case of the electronic pen main body unit 3A of the second embodiment having such a configuration as described above, functions similar to those of the electronic pen main body unit 3 of the first embodiment described hereinabove are implemented. However, in the case of the electronic pen main body unit 3A of the present second embodiment, since the core rod 38 of a pipe shape is fitted with and fixed to the ferrite core 32, even if the electronic pen main body unit 3A is performed slimmed down, the strength of a pen tip portion can be made strong.

Then, in the case of the electronic pen main body unit 3A of the present second embodiment, it has a configuration that the core 39 is inserted for sliding movement in the hollow portion (through-hole) of the core rod 38 of a pipe shape. Therefore, the writing pressure applied to the core 39 is transmitted directly to the writing pressure detector 36A through the core 39, and detection of the writing pressure can be performed appropriately and accurately and besides with a good reaction.

Third Embodiment

In the case of the electronic pen main body units 3 and 3A of the first and second embodiments described above, it is described that the ferrite core 32 or 32A, the tubular body unit 33 or 33A in which the printed circuit board 37 or 37A is accommodated are connected directly to each other. However, the electronic pen main body unit is not limited to this. In the case of the electronic pen main body unit of the present third embodiment, it includes a holder unit that connects a ferrite core and a printed circuit board to each other and a board protective pipe that accommodates the printed circuit board therein is connected to the holder unit.

FIG. 8 illustrates an exploded perspective view depicting an example of a configuration of an electronic pen main body unit 3B of the third embodiment. A coil unit 8 is formed by winding a coil 83 around a cylindrical ferrite core 82. Also in the case of the electronic pen main body unit 3B of the present third embodiment, a first coil non-winding portion 82b and a second coil non-winding portion 82c that have no coil wound thereon are provided at front and rear portions of a coil winding portion 82a of the ferrite core 82 on which the coil 83 is wound.

Further, the ferrite core 82 has a through-hole at a position including the center line in the axial direction, and a core rod 81 of a pipe shape is inserted in and fitted in and fixed to the through-hole. The pen tip side of the core rod 81 partly projects from the ferrite core 82. Furthermore, in the hollow portion (through-hole) of the core rod 81 of a pipe shape inserted in and fitted in and fixed to the through-hole of the ferrite core 82, a core 7 having a diameter smaller than the diameter of the through-hole is inserted for sliding movement.

In this manner, a core unit 30B that is configured from the coil unit 8 configured from the core rod 81 of a pipe shape, the ferrite core 82, and the coil 83 and the core 7 and is a portion on the pen tip side has a configuration similar to that of the core unit 30A that is configured from the coil 31, the ferrite core 32A, the core rod 38, and the core 39 of the second embodiment described hereinabove.

A connection unit 9 configures a holder portion that connects a portion on the pen tip side configured from the core 7 and the coil unit 8 and a printed circuit board 10 and a substrate protective pipe 12 hereinafter described to each other. Further, as depicted in FIG. 8, in the connection unit 9, three portions of a writing pressure detector 91, a fitting portion 92, and a connection terminal unit 93 are formed integrally using a material such as resin, hard rubber or the like.

The writing pressure detector 91 of the connection unit 9 is formed cylindrically, and the outer circumference and the shape of an end face on the coil unit 8 side substantially coincide with the outer circumference and the shape of an end face of a winding portion 83a that is a portion of the coil unit 8 on which the coil 83 is wound. Further, on an end face side of the writing pressure detector 91 opposing to the coil unit 8, a recessed portion into which the second coil non-winding portion 82c of the ferrite core 82 of the above-described coil unit 8 on which the coil 83 is not wound is provided. Further, in the inside of the writing pressure detector 91, a member for holding the core 7 and a writing pressure detector for detecting the writing pressure applied to the core 7 are provided as hereinafter described.

The fitting portion 92 of the connection unit 9 is a portion continuing to the writing pressure detector 91 and is a portion that is formed substantially cylindrically and is to fit with a substrate protective pipe 12 hereinafter described. Though not depicted, on the inner side of the fitting portion 92, a recessed portion with which a protrusion 10a of the printed circuit board 10 hereinafter described is to fit is provided. The connection terminal unit 93 of the connection unit 9 is a portion continuing to the fitting portion 92 and includes two upper and lower plate portions connecting to the fitting portion 92 as depicted in FIG. 8. The plate portions sandwich the printed circuit board 10 hereinafter described therebetween. Further, on one of the two plate portions, terminals 93a and 93b to which signal lines from terminal portions of the writing pressure detector of the writing pressure detector 91 are connected are provided as depicted in FIG. 8.

The printed circuit board 10 is formed such that terminals 10c and 10d and various circuit parts are mounted on an insulating board of a rectangular shape that has protrusions 10a and 10b provided at the opposite ends thereof in the axial direction and wiring lines that connect them are provided. The various circuit boards include an integrated circuit (IC) 10e that functions as a control circuit, a side switch 10f, capacitors 10g and 10h, . . . and so forth. The printed circuit board 10 is accommodated in the inside of and protected by the substrate protective pipe 12 as depicted in FIG. 8.

The printed circuit board 10 is ideally accommodated in the substrate protective pipe 12 such that an axis O of the substrate protective pipe 12 and the axis of the printed circuit board 10 substantially coincide with each other.

The substrate protective pipe 12 is formed using metal, a carbon material, synthetic resin or the like and is a hard pipe member that is less liable to be broken or bent. The substrate protective pipe 12 has, at the opposite ends thereof, a core side opening 121 and a rear end side opening 122 as depicted in FIG. 8. The core side opening 121 and the rear end side opening 122 are openings directed so as to cross with the axial direction. Further, a portion of the inner side of the substrate protective pipe 12 within a predetermined range from the core side opening 121 serves as a core side fitting portion 121a into and in which the fitting portion 92 of the connection unit 9 is to be inserted and fitted. Similarly, a portion of the inner side of the substrate protective pipe 12 of the rear end side opening 122 within a predetermined range serves as a rear end side fitting portion 122a into and in which a pipe lid 13 hereinafter described is inserted and fitted.

It is to be noted that, in the present embodiment, at a portion of the rear end side fitting portion 122a, a projection 122b for fitting with a recessed portion 13b of the pipe lid 13 hereinafter described is provided as depicted in FIG. 8.

Furthermore, the substrate protective pipe 12 has an opening (side face opening extending in a direction along the axial direction) 123 formed by cutting away part of a side wall of the substrate protective pipe 12 in such a manner as to connect the core side opening 121 and the rear end side opening 122 to each other. In this case, the substrate protective pipe 12 has a side wall of an angular range of 180 degrees or more around the axis even if the opening 123 is provided.

Further, on the substrate protective pipe 12, a cutaway portion 121b is provided at a portion of the core side fitting portion 121a as depicted in FIG. 8. In the cutaway portion 121b, though not depicted, a protrusion provided on the fitting portion 92 of the connection unit 9 is fitted such that, in the case where the substrate protective pipe 12 is fitted with the fitting portion 92, the positions of them are restricted such that neither of them rotates. Further, a substrate cradle 11 of a trapezoidal shape is attached to the substrate protective pipe 12 as depicted in FIG. 8. The substrate cradle 11 comes to be positioned between the substrate protective pipe 12 and the printed circuit board 10.

Furthermore, the pipe lid 13 that is to fit with the rear end side fitting portion 122a of the substrate protective pipe 12 is provided as depicted in FIG. 8. The pipe lid 13 has a fitting portion 13a that coincides with the inner diameter of the rear end side fitting portion 122a of the substrate protective pipe 12. Further, on the inner side of the fitting portion 13a of the pipe lid 13, a recessed portion 13c with which a protrusion 10b of the printed circuit board 10 is to fit is provided.

Further, the core 7 extends through the core rod 81 fitted in and fixed to the ferrite core 82 of the coil unit 8 to the writing pressure detector 91 of the connection unit 9 that fits with the ferrite core 82 and is held by the writing pressure detector 91. Further, the printed circuit board 10 is inserted between the two plate portions of the connection terminal unit 93 of the connection unit 9. Consequently, the protrusion 10a on the core body side of the printed circuit board 10 is fitted into the recessed portion of the fitting portion 92 and the printed circuit board 10 is held by and between the two plate portions of the connection terminal unit 93. Then, the terminal 93a of the connection terminal unit 93 and the terminal 10c of the printed circuit board 10 are brought into contact with each other and the terminal 93b of the connection terminal unit 93 and the terminal 10d of the printed circuit board 10 are brought into contact with each other.

The terminals 10c and 10d of the printed circuit board 10 are connected to an electric circuit formed on the printed circuit board 10 and configured from the IC 10e, the side switch 10f, the capacitors 10g and 10h, . . . and so forth. Consequently, the IC 10e can detect and utilize the writing pressure. Further, though not depicted in FIG. 8, also extension lines 83a and 83b from the opposite ends of the coil 83 of the coil unit 8 are connected to the electronic circuit formed on the printed circuit board 10. Consequently, the coil 83 configures a resonance circuit together with the IC 10e, the capacitors 10g and 10h, . . . and so forth of the printed circuit board 10.

Figure 9:
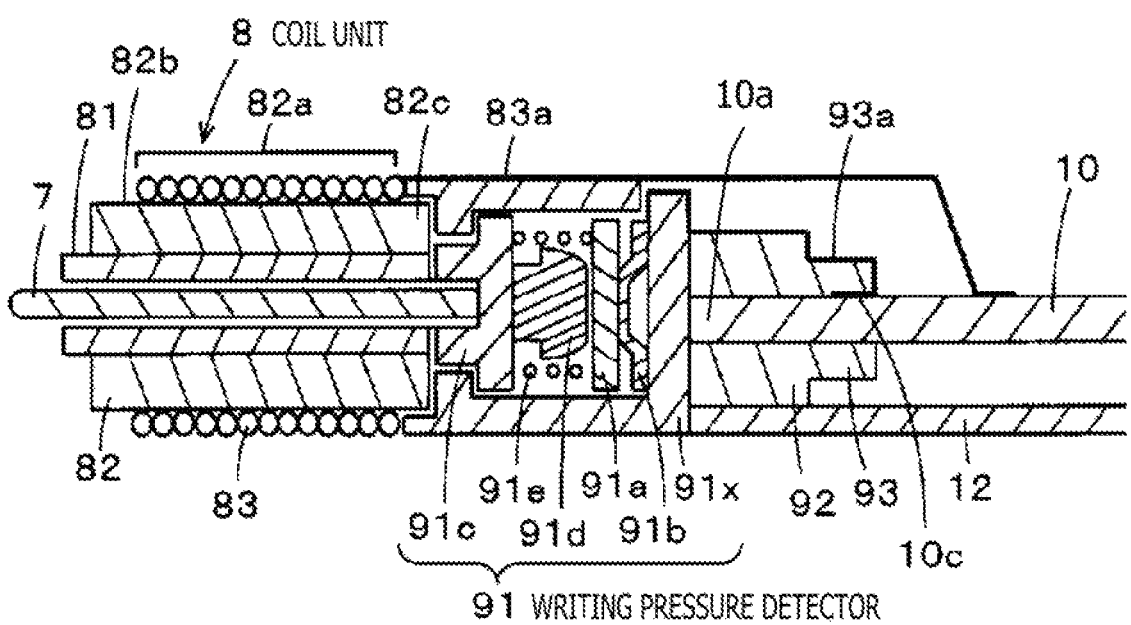
FIG. 9 is a view illustrating a configuration of a principal portion of the third embodiment of the electronic pen main body unit according to the present disclosure.

FIG. 9 is a cross sectional view of the connection portion where the core 7, the coil unit 8, the connection unit 9, the printed circuit board 10, and the substrate protective pipe 12 are connected. The coil unit 8 is a portion configured from the core rod 81, the ferrite core 82, and the coil 83 as described hereinabove. In FIG. 9, the writing pressure detector 91 of the connection unit 9 is formed by providing a writing pressure detection member, for example, in a resin molded member 91x. Further, the second coil non-winding portion 82c of the coil unit 8 on which the coil 83 is not wound is fitted in and connected to the recessed portion of the writing pressure detector 91 of the connection unit 9 as depicted in FIG. 9.

The pressure sensitive member of the writing pressure detector 91 is configured from a plurality of parts including a dielectric member 91a, a terminal member 91b, a holding member 91c, another dielectric member 91d, and an elastic member 91e as depicted in FIG. 9. The terminal member 91b is formed from a conductive material and configures a first electrode of a variable capacitor serving as the writing pressure detector. Meanwhile, the dielectric member 91d is configured, for example, from conductive rubber, and the elastic member 91e is configured from a coil spring made of a conductive material. The dielectric member 91d and the elastic member 91e are electrically connected to each other and configure a second electrode of the variable capacitor.

Further, as depicted in FIG. 9, the core 7 extends through the core rod 81 of a pipe shape of the coil unit 8 to and is held by the holding member 91c of the writing pressure detector 91. Consequently, the capacitance of the variable capacitor (writing pressure detection member) formed between the terminal member 91b configuring the first electrode and the dielectric member 91d configuring the second electrode varies in response to the pressure applied to the core 7. A variation of the capacitance of the variable capacitor is connected to the connection terminals 93a and 93b of the connection terminal unit 93 through the signal lines.

Furthermore, as depicted in FIG. 9, the protrusion 10a on the core body side of the printed circuit board 10 fits in the fitting portion 92 and the printed circuit board 10 is connected in such a manner that it is sandwiched between the two plate portions of the printed circuit board 10. Further, as depicted in FIG. 9, the connection terminal 93a of the connection terminal unit 93 and the terminal 10c of the printed circuit board 10 are connected to each other. Further, the connection terminal 93b of the connection terminal unit 93 and the terminal 10d of the printed circuit board 10 are connected to each other. Consequently, the signal lines from the terminal members of the writing pressure detector of the writing pressure detector 91 are connected to the printed circuit board 10 as described hereinabove. Further the extension lines 83a and 83b from the opposite ends of the coil 83 wound on the ferrite core 82 and the printed circuit board 10 are connected to each other and configure a resonance circuit together with the capacitor 10g and so forth of the printed circuit board 10, as described hereinabove.

Further, the printed circuit board 10 is accommodated in the substrate protective pipe 12. In this case, the fitting portion 92 of the connection unit 9 and the core side fitting portion 121a of the substrate protective pipe 12 fit with each other such that the connection unit 9 and the substrate protective pipe 12 are not separated from each other. Consequently, the printed circuit board 10 is protected by the substrate protective pipe 12 such that it is not curved or broken.

Thus, in the case of the electronic pen main body unit 3B of the present third embodiment, by fitting and fixing the core rod 81 of a pipe shape with and to the ferrite core 82, the strength of the pen tip portion formed from the core 7 and the coil unit 8 can be increased. In particular, even if the ferrite core 82 itself is made thin by slimming down of the electronic pen, the pen tip portion that is tough and is not damaged readily can be configured by the existence of the core rod 81.

Furthermore, the pen tip portion configured from the core 7 and the coil unit 8 and the printed circuit board 10 can be connected simply and firmly to each other through the connection unit 9, and the printed circuit board 10 is accommodated in the substrate protective pipe 12 and can be protected from external pressure. Further, since the substrate protective pipe 12 has the opening 123 elongated in the axial direction, the opposite ends of the coil 83 can be connected to the electronic circuit of the printed circuit board 10 through the opening 123. Also it is possible to perform a work for cutting, for a capacitor that comes to configure a resonance circuit together with the coil 83, an unnecessary connection of the capacitor through the opening 123.

By attaching the electronic pen main body unit 3B formed in this manner in the housing of a ballpoint pen in a manner similar to that of a replacement core of a ballpoint pen, an electronic pen that is used by a user can be configured. It is to be noted that also it is possible to accommodate the electronic pen main body unit 3B into a predetermined case so as to establish a form of a replacement core of a ballpoint pen.

It is to be noted that, also in the present third embodiment, the core rod 81 of a pipe shape is formed from SUS (stainless steel) similarly as in the case of the core rod 34 in the first embodiment, and preferably is configured using SUS304 or SUS316. Further, the core rod 81 is configured from a metal material other than SUS or ceramic. Further, the core rod 81 may be configured using a material such as a carbon resin, reinforced plastic or the like having a strength similar to that of metal such as SUS.

Also the core 7 may be configured from SUS similarly to the core rod 81, or also it is possible to form the core 7 from other various conductive materials. For example, also it is possible to configure the core 39 from resin into which metal or carbon is mixed so as to have conductivity. Also the core 7 may be configured from ceramic.

<Connection Mode Between Pen Tip Portion and Tubular Body Portion or the Like Using Connection Unit (Holder)>

In the case of the electronic pen main body unit 3B of the third embodiment described with reference to FIGS. 8 and 9, the core unit 30B configured from the core 7 and the coil unit 8 and the printed circuit board 10 or the substrate protective pipe 12 are connected to each other through the connection unit 9 as a holder. The connection that uses the connection unit 9 as a holder can be applied also to the electronic pen main body units 3 and 3A of the first and second embodiments.

In particular, in the case of the electronic pen main body unit 3 of the first embodiment, the ferrite core 32 and the tubular body unit 33 are directly connected to each other. Similarly, in the case of the electronic pen main body unit 3A of the second embodiment, the ferrite core 32A and the tubular body unit 33A are directly connected to each other. However, it is possible to interpose a connection unit as a holder between the ferrite core 32 and the tubular body unit 33 or interpose the connection unit as a holder between the ferrite core 32A and the tubular body unit 33A.

FIGS. 10A, 10B, 10C, 11A, and 11B are views illustrating an example of a case in which a core unit 30 configured by fitting and fixing a core rod 34 of a solid body into and to a ferrite core 32 on which the coil 31 described in the first embodiment is wound and a tubular body unit 33 are connected to each other using a connection unit as a holder. In FIGS. 10A, 10B, 10C, 11A, and 11B, portions configured similarly to those of the electronic pen main body unit 3 of the first embodiment described with reference to FIGS. 1A to 3B are denoted by like reference symbols, and detailed description of them is omitted.

Figure 10A:
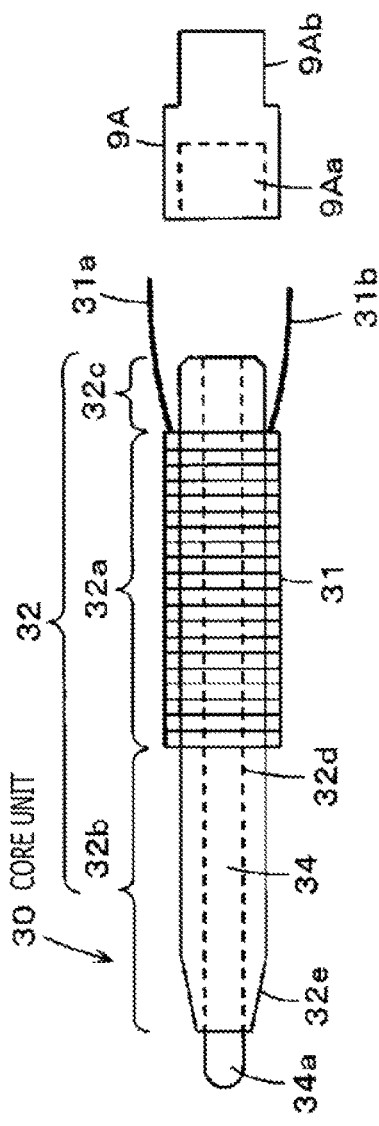
FIGS. 10A, 10B, and 10C illustrate views depicting an example of a case in which a pen tip side portion and a tubular body unit and so forth are connected to each other using a connection unit as a holder.

The core unit 30 of the example of FIG. 10A is configured similarly to the core unit 30 of the electronic pen main body unit 3 of the first embodiment described hereinabove. In particular, the ferrite core 32 is configured from a coil winding portion 32a on which a coil 31 is wound, a first coil non-winding portion 32b on the pen tip side on which the coil 31 is not wound, and a second coil non-winding portion 32c on the opposite side to the pen tip side on which the coil 31 is not wound. The tapered portion 32e on the pen tip side of the ferrite core 32 is formed in a tapered shape. Further, in and to a portion of the ferrite core 32 including the center line in the axial direction, the core rod 34 of a solid body is fitted and fixed, and the tip end portion 34a of the same projects from the pen tip side of the ferrite core 32.

Further, a connection unit 9A as a holder is used for the connection of the core unit 30 depicted in FIG. 10A and, for example, the tubular body unit 33 of the first embodiment, the substrate protective pipe 12 of the third embodiment or the like. The connection unit 9A is configured from a material such as, for example, resin or hard rubber. The connection unit 9A has, at the ferrite core 32 side thereof, an end face same in outer circumference and shape as an end face of the coil winding portion 32a portion of the ferrite core 32, and a fitting portion 9Aa that is a recessed portion in which the second coil non-winding portion 32c of the ferrite core 32 is to fit is formed.

On the other hand, on the opposite side of the connection unit 9A to the ferrite core 32, a column-like protrusion 9Ab having a diameter coincident with the inner diameter of the tubular body unit 33 is formed. The tubular body unit 33 or the like is fitted in and held by the protrusion 9Ab. Further, the outer circumference and the shape of the end face also of the tubular body unit 33 and so forth are same as those of the end portion of the coil winding portion 32a portion of the ferrite core 32 such that an electronic pen main body unit having no step on a side face thereof can be configured.

Further, since the connection unit 9A is formed from a material having some elastic force such as resin or hard rubber as described above, the ferrite core 32, tubular body unit 33 or the like can be connected simply. Further, the connection unit 9A can firmly hold the ferrite core 32, tubular body unit 33 or the like fitted therewith to firmly connect them to each other.

Figure 10B:
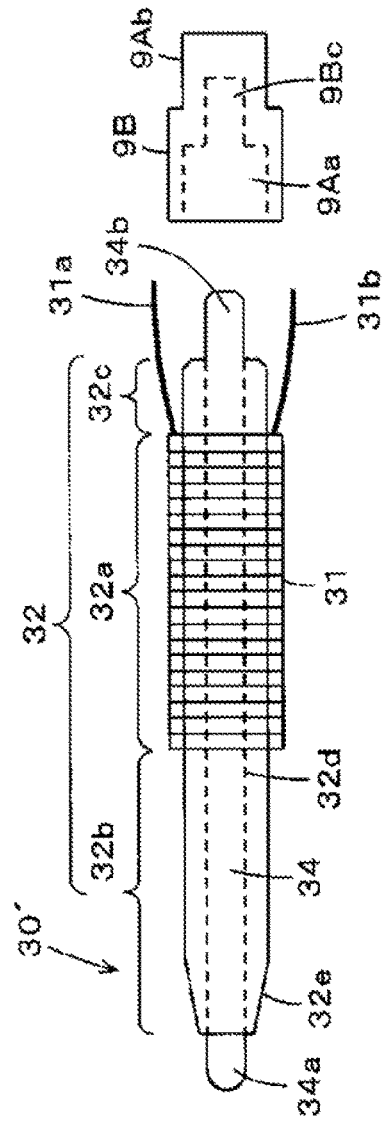

A core unit 30' depicted in FIG. 10B is configured such that it projects at one end portion 34a of the core rod 34 thereof from the pen tip side of the ferrite core 32 and projects at the other end portion 34b of the core rod 34 thereof from the opposite side (rear end side) to the pen tip side of the ferrite core 32. Except that the end portion 34b projects from the rear end side, the other part of the core unit 30' is configured similarly to that of the core unit 30 depicted in FIG. 10A. Further, in the example depicted in FIG. 10B, the connection unit 9B has an appearance shape same as that of the connection unit 9A depicted in FIG. 10A.

However, in the case of the connection unit 9B depicted in FIG. 10B, a fitting portion 9Bc that fits with the other end portion 34b portion of the core rod 34 is provided in addition to the fitting portion 9Aa that fits with the second coil non-winding portion 32c of the ferrite core 32. Thus, it is assumed that the core unit 30' depicted in FIG. 10B is connected to the connection unit 9B. In this case, the end portion 34b on the rear end side of the core rod 34 fitted with and fixed to the ferrite core 32 is fitted with the fitting portion 9Bc of the connection unit 9B, and further, the second coil non-winding portion 32c of the ferrite core 32 fits with the fitting portion 9Aa of the connection unit 9B. Consequently, the core unit 30' configured from the coil 31, the ferrite core 32, and the core rod 34 and the connection unit 9B can be connected to each other firmly and can be connected firmly also to the portion on the pen tip side and, the tubular body unit 33 and so forth.

Figure 10C:
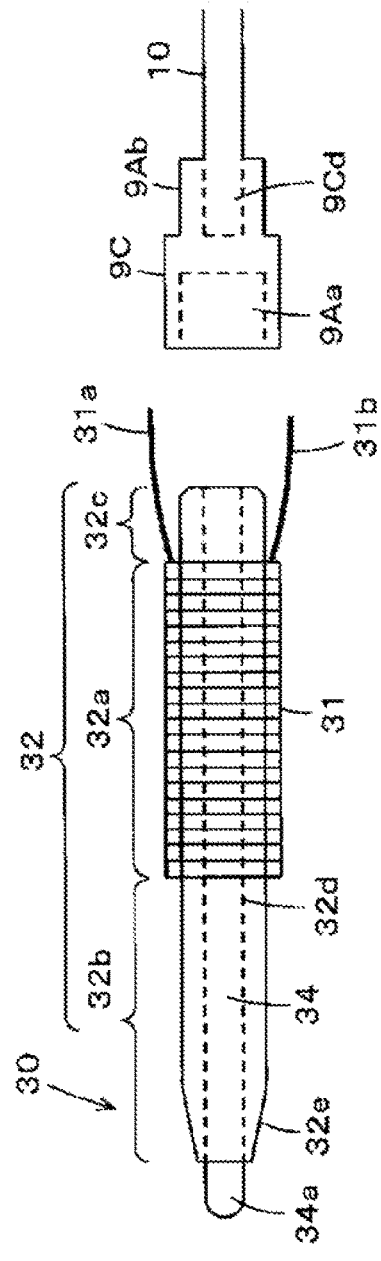

The core unit 30 of the example depicted in FIG. 10C is configured similarly to the core unit 30 of the electronic pen main body unit 3 of the first embodiment described hereinabove and the core unit 30 depicted in FIG. 10A. Further, in the example depicted in FIG. 10C, a connection portion 9C has an outer shape same as that of the connection unit 9A depicted in FIG. 10A. However, in the example depicted in FIG. 10C, the connection portion 9C has provided, at a portion of the protrusion 9Ab with which the tubular body unit 33 or the like is to fit, a fitting portion 9Cd that is a recessed portion into which the printed circuit board 10A is to be fitted.

By the connection portion 9C on which the fitting portion 9Aa and the fitting portion 9Cd are provided, also the printed circuit board 10A can be connected and fixed in addition to the core unit 30, the tubular body unit 33 and so forth. Consequently, the core unit 30 and the printed circuit board 10A can be connected simply and firmly to each other, and the printed circuit board 10A can be protected appropriately by the tubular body unit 33 and so forth.

Figure 11A:
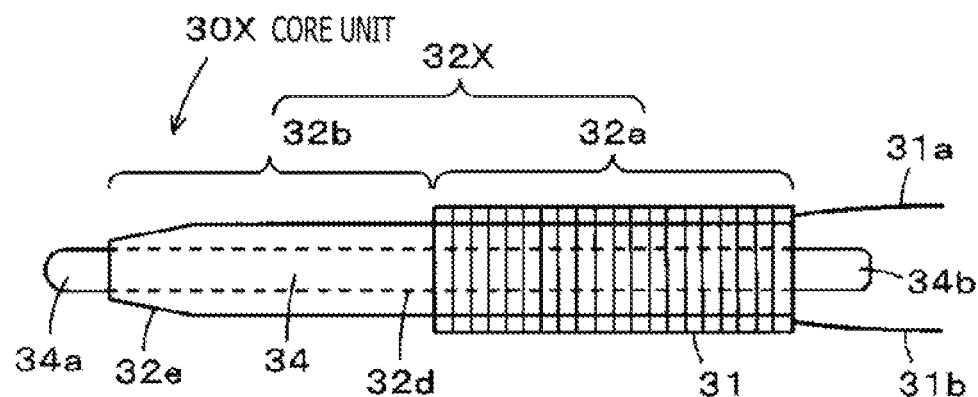
FIGS. 11A and 11B illustrate views depicting an example of the case in which the pen tip side portion and the tubular body unit and so forth are connected to each other using the connection unit as the holder.

Further, while any ferrite core 32 in the case of the examples depicted in FIGS. 10A, 10B, and 10C includes the first coil non-winding portion 32b and the second coil non-winding portion 32c that do not have the coil 31 wound thereon, the ferrite core is not limited to this. For example, a core unit 30X depicted in FIG. 11A is configured such that, although a ferrite core 32X includes a coil winding portion 32a on which the coil 31 is wound and a first coil non-winding portion 32b on which the coil 31 is not wound, it does not include the second coil non-winding portion 32c. In this case, on the tubular body portion or the connection portion to be connected to the ferrite core 32X, a fitting portion that is to fit with the end portion 34b of the core rod 34 projecting from the ferrite core 32X may be provided.

Further, in the case of the examples depicted in FIGS. 10A, 10B, and 10C, the end portion 32e on the pen tip side of any ferrite core 32 has a tapered shape, the ferrite core 32 is not limited to this. In a core unit 30Y depicted in FIG. 11B, an end portion of a coil non-winding portion 32b' on the pen tip side of the ferrite core may not have a tapered shape as indicated by a ferrite core 32Y. Accordingly, also it is possible to configure the core units 30 and 30X in the examples depicted in FIGS. 10A, 10B, and 10C such that an end portion on the pen tip side of the ferrite core 32 does not have a tapered shape as depicted in FIG. 12B.

Figure 11B:
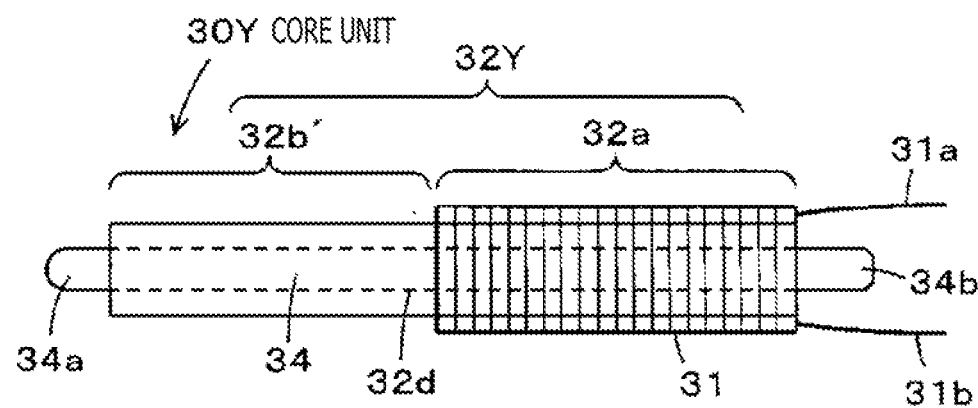
Figure 12:
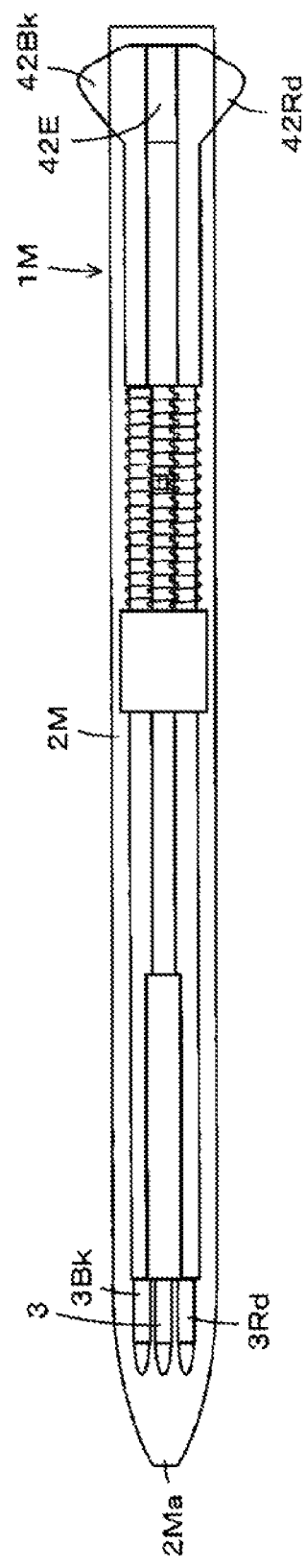
FIG. 12 is a configuration view depicting an appearance of an electronic pen having a configuration as a multicolor pen configured using an electronic pen main body unit and a cartridge of an ordinary ballpoint pen.

It is to be noted that, while, in FIGS. 10A, 10B, 10C, 11A, and 11B, the core portion that is a portion on the pen tip side is configured from the coil 31, the ferrite core 32, and the core rod 34, the core body portion is not limited to this. Similarly as in the case of the electronic pen main body unit 3A of the second embodiment, a portion on the pen tip side configured from the coil 31, the ferrite core 32, the core rod 38 of a pipe shape, and the core 39 can be configured in such a manner as depicted in FIGS. 11A, 11B, and 12. In this case, the ferrite core 32 is replaced into the core rod 38 of a pipe shape and the core 39.

Further, in the case where a portion on the pen tip configured from the coil 31, the ferrite core 32, the core rod 38 of a pipe shape, and the core 39 is to be used, it is possible to use a configuration in which a writing pressure detector that is depressed by the core 39 is provided at the portion of the connection unit 9A, 9B, or 9C.

Figure 13:
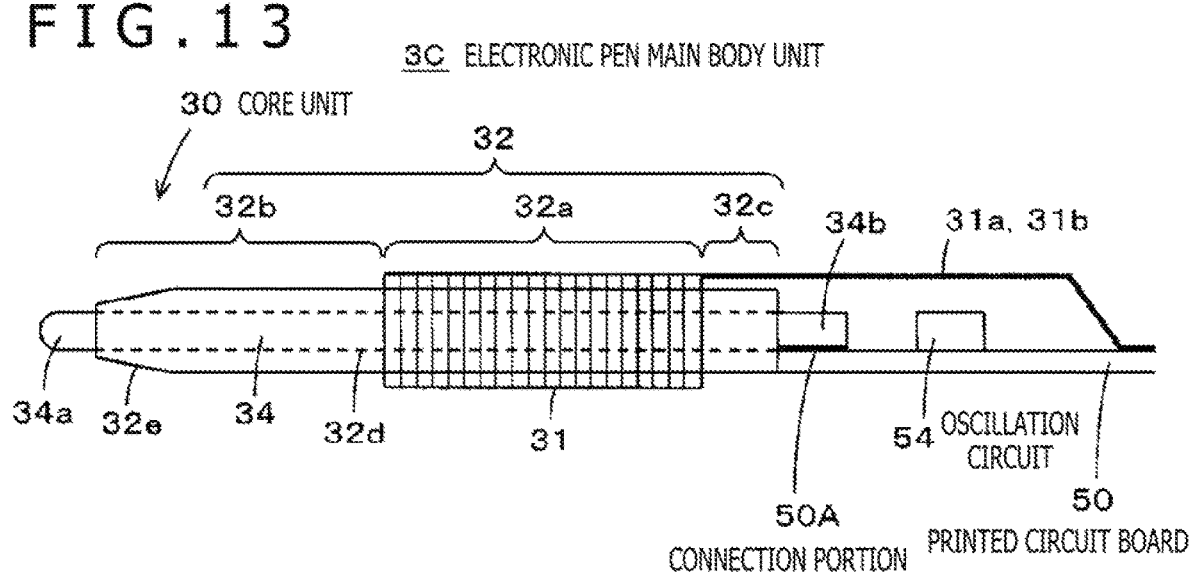
FIG. 13 is a view illustrating an electronic pen main body unit of the capacitive type according to a fourth embodiment of the present disclosure.

It is to be noted that also the core rod 34 depicted in FIG. 13 is formed from SUS (stainless steel) such as, for example, SUS304 or SUS316. However, the core rod 34 is not limited to this. The core rod 34 may otherwise be configured from other metal or ceramic.

<Application to Multicolor Pen>

FIG. 12 is a configuration view depicting an appearance of an electronic pen 1M configured as a multicolor pen using an electronic pen main body unit 3 configured as a cartridge of the ballpoint pen of the first embodiment described hereinabove and a cartridge of an ordinary ballpoint pen. Also in the example of FIG. 12, a housing 2M of the electronic pen 1M is configured from transparent synthetic resin, and the example is depicted in a state in which the inside thereof can be seen through the housing 2M.

The housing 2M of the electronic pen 1M includes a configuration same as that of the housing and the knock mechanism of a multicolor ballpoint pen of the knock type on the market. The housing and the knock mechanism of a multicolor ballpoint pen of the knock type on the market may be used as they are. In the housing 2M, in the present example, the electronic pen main body unit 3 of the first embodiment, a ballpoint pen cartridge 3Bk for black ink, and a ballpoint pen cartridge 3Rd for red ink are accommodated. The electronic pen main body unit 3 has a shape depicted in FIG. 2B, and both of the ballpoint pen cartridges 3Bk and 3Rd have the shape depicted in FIG. 2A.

The knock mechanism of the electronic pen 1M includes a knock bar 42E with which the electronic pen main body unit 3 is fitted, a knock bar 42Bk with which the ballpoint pen cartridge 3Bk for black ink is fitted, and a knock bar 42Rd with which the ballpoint pen cartridge 3Rd for red ink is fitted. When the knock bar 42E slidably moves to the pen tip side, the end portion 34a of the core rod 34 and part of the coil non-winding portion 32b of the ferrite core 32 of the electronic pen main body unit 3 project to establish electromagnetic induction coupling to a sensor of a position detection apparatus.

Further, when the knock bar 42Bk slidably moves to the pen tip side, the pen tip unit 61 of the ballpoint pen cartridge 3Bk projects to allow writing with the black ink. Similarly, when the knock bar 42Rd slidably moves to the pen tip side, the pen tip unit 61 of the ballpoint pen cartridge 3Rd projects thereby to allow writing with the red ink.

In this manner, by incorporating the electronic pen main body unit 3 of the first embodiment as one of ballpoint pen cartridges into the housing of a multicolor ballpoint pen of the knock type on the market, the electronic pen main body unit 3 can add the function as an electronic pen to the multicolor ballpoint pen.

Further, although the electronic pen main body unit 3 of the first embodiment is used here, the electronic pen main body unit is not limited to this. By using the electronic pen main body unit 3A of the second embodiment or the electronic pen main body unit 3B of the third embodiment in place of one of ballpoint pen cartridges of a multicolor ballpoint pen, the function of an electronic pen can be added to the multicolor ballpoint pen.

Fourth Embodiment (Application to Active Capacitive Pen)

All of the electronic pen main body units 3, 3A, and 3B of the first to third embodiments described above are described as those of the electromagnetic induction coupling type. In particular, the electronic pen main body units 3, 3A, and 3B of the first to third embodiments described above include a resonance circuit configured from the coil 31 and a capacitor, and receive a signal from a position detection apparatus, cause a signal according to the received signal to be generated by the function of the resonance circuit, and return the signal to the position detection apparatus to indicate a position or the like to the position detection apparatus. However, the present disclosure can be applied not only to an electronic pen of the electromagnetic induction type but also to an electronic pen of the capacitive coupling type (hereinafter referred to as capacitive type).

Figure 14:
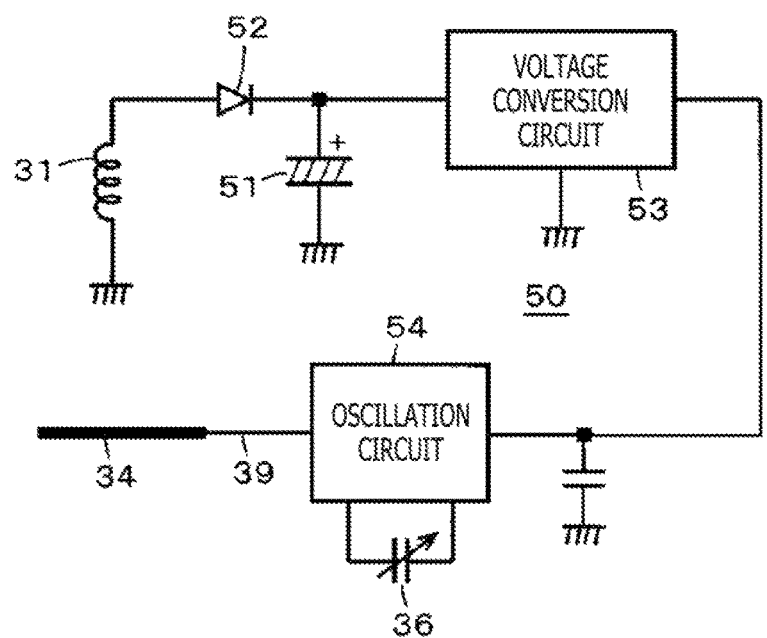
FIG. 14 is a circuit diagram of the electronic pen main body unit of the fourth embodiment of the present disclosure.

FIG. 13 is a view illustrating an electronic pen main body unit 3C of the capacitive type of a fourth embodiment to which the present disclosure is applied. FIG. 14 is a circuit diagram of the electronic pen main body unit 3C of the fourth embodiment. In FIGS. 13 and 14, like components are denoted by like reference symbols. Also in the electronic pen main body unit 3C of the present fourth embodiment, portions configured similarly to those of the electronic pen main body unit 3 of the first embodiment are denoted by like reference symbols in FIGS. 13 and 14, and detailed description of them is omitted.

As depicted in FIG. 13, also in the case of the electronic pen main body unit 3C of the capacitive type of the fourth embodiment, a core unit 30 configured from a coil 31, a ferrite core 32, and a core rod 34 is configured similarly to the core unit 30 of the electronic pen main body unit 3 of the first embodiment.

It is to be noted that, in the electronic pen main body unit 3C of the present fourth embodiment, the coil 31 does not configure a resonance circuit for position indication by electromagnetic induction but is used as a supply end of power for accepting supply of power from the outside and implements a non-contact charging function. Further, extension lines 31a and 31b from the opposite ends of the coil 31 are connected to a power supply circuit portion configured from an electric double layer capacitor 51, a rectifying diode 52, a voltage conversion circuit 53 and so forth connected to each other on a printed circuit board 50 as hereinafter described.

Then, at a position including the center line in the axial direction of the ferrite core 32, a core rod 34 of a solid body is fitted and fixed. In the case of the electronic pen main body unit 3C of the present fourth embodiment, on the pen tip side, the end portion 34a of the core rod 34 projects from the ferrite core 32 as depicted in FIG. 13. Also on the opposite side to the pen tip side, the end portion 34b on the opposite side to the pen tip side of the core rod 34 projects from the ferrite core 32.

Then, the end portion 34b on the opposite side to the pen tip side of the core rod 34 is electrically connected at a connection portion 50A of the printed circuit board 50 to an electronic circuit unit including an oscillation circuit 54 formed on the printed circuit board 50 as depicted in FIG. 13. Consequently, a signal oscillated by the oscillation circuit 54 is transmitted through the core rod 34 of a solid body to the position detection apparatus side such that it can indicate a position.

It is to be noted that also the core rod 34 depicted in FIG. 13 is formed from SUS (stainless steel) such as, for example, SUS304 or SUS316. However, the core rod 34 is not limited to this. The core rod 34 may be configured from other metal or ceramic.

Now, a circuit configuration of the electronic pen main body unit 3C of the capacitive type of the present fourth embodiment is described. Referring to FIG. 14, reference numeral 51 denotes an electric double layer capacitor, 52 a rectifying diode, 53 a voltage conversion circuit, and 54 an oscillation circuit that configures a signal oscillation circuit of the present example. As depicted in FIG. 14, in the present example, the coil 31 is connected at one end thereof to the anode of the diode 52 and is grounded (GND) at the other end thereof. Further, the electric double layer capacitor 51 is connected at one end thereof to the cathode of the diode 52 and is grounded at the other end thereof.

The core rod 34 that configures an electrode core is electrically connected to the oscillation circuit 54. Similarly as in the case of the electronic pen main body unit 3 of the first embodiment described hereinabove with reference to FIGS. 2B and 2C, a writing pressure detector 36 provided on the rear end side of the electronic pen main body unit 3C is electrically connected to the oscillation circuit 54.

The oscillation circuit 54 generates a signal whose frequency varies in response to the capacitance of the variable capacitor of the writing pressure detector 36 and supplies the generated signal to the core rod 34. The signal from the oscillation circuit 54 is radiated as an electric field based on the signal from the end portion 34a of the core rod 34. The oscillation circuit 54 is configured from an inductance-capacitance (LC) oscillation circuit that utilizes resonance, for example, by a coil and a capacitor. A position detection apparatus that detects a coordinate position indicated by the electronic pen main body unit 3C of the present embodiment can determine writing pressure applied to the core rod 34 from the frequency of the signal.

The voltage conversion circuit 53 converts a voltage accumulated in the electric double layer capacitor 51 into a fixed voltage and supplies the voltage as power supply to the oscillation circuit 54. The voltage conversion circuit 53 may be that of the step-down type that steps down the voltage across the electric double layer capacitor 51 or may be that of the step-up type that steps up the voltage across the electric double layer capacitor 51. Alternatively, the voltage conversion circuit 53 may be that of the step-up and step-down type that operates as a step-down circuit in the case where the voltage across the electric double layer capacitor 51 is higher than the fixed voltage but operates as a step-up circuit in the case where the voltage across the electric double layer capacitor 51 is lower than the fixed voltage.

When the electronic pen main body unit of the capacitive type of the present fourth embodiment is amounted on a charger not depicted, induced electromotive force is generated in the coil 31 by an alternating magnetic field generated by the charger to charge the electric double layer capacitor 51 through the diode 52.

<Circuit Configuration for Position Detection and Writing Pressure Detection in Position Detection Apparatus of Capacitive Type>

Figure 15:
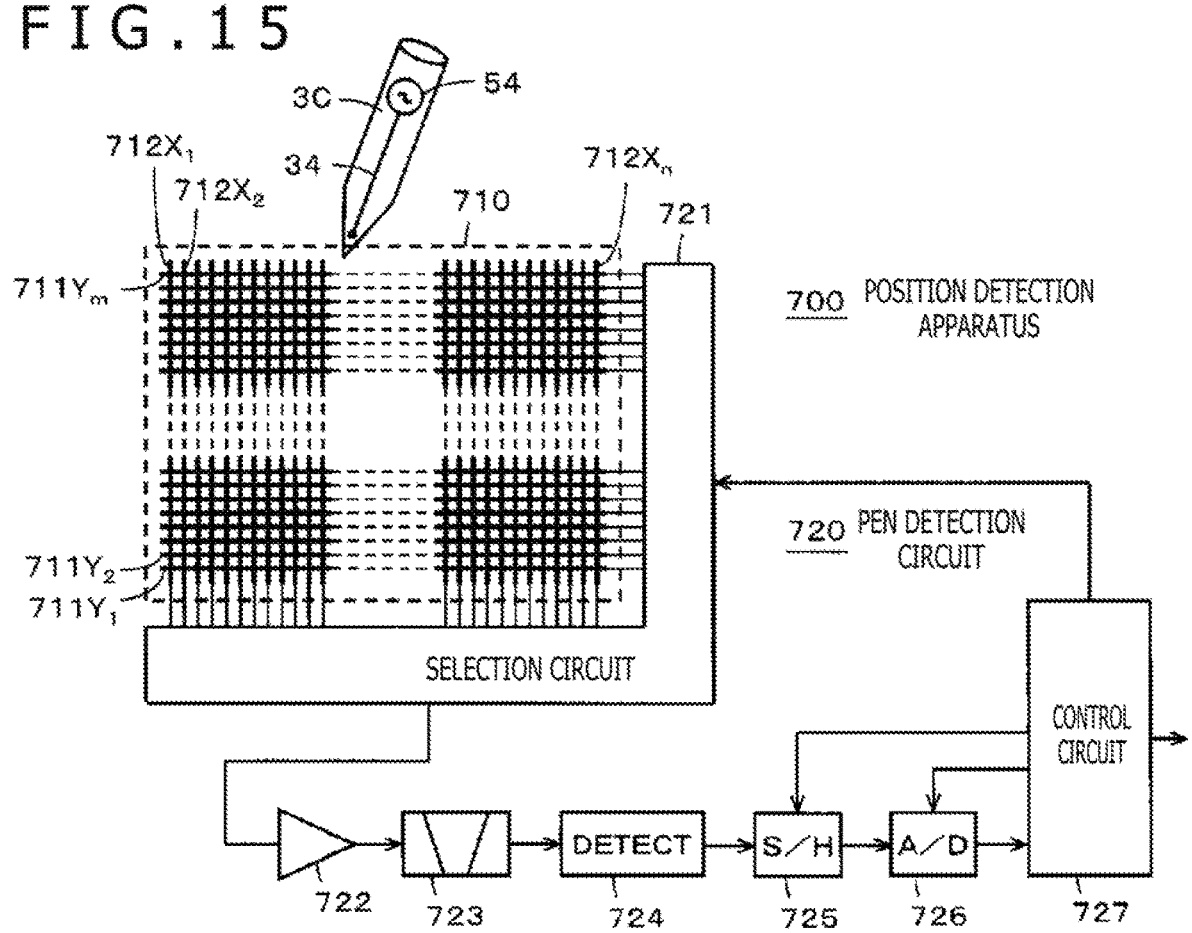
FIG. 15 is a block diagram illustrating a position detection apparatus used together with an electronic pen main body unit of the capacitive type.

FIG. 15 is a block diagram illustrating a position detection apparatus 700 that receives a signal from the electronic pen main body unit 3C of the capacitive type, which is an example of the electronic pen of the fourth embodiment, to detect the position on the sensor and detect the writing pressure.

The position detection apparatus 700 of the present embodiment includes a sensor 710 and a pen detection circuit 720 connected to the sensor 710 as depicted in FIG. 15. Although a cross sectional view of the present example is not depicted, the sensor 710 is formed by stacking a first conductor group 711, an insulating layer (not depicted), and a second conductor group 712 in order from the lower layer side. The first conductor group 711 includes, for example, a plurality of first conductors 711Y1, 711Y2, ..., 711Ym (m is an integer equal to or greater than 1) extending in the horizontal direction (X-axis direction) and disposed in the Y-axis direction in parallel in a spaced relationship by a predetermined distance from each other.

Meanwhile, the second conductor group 712 includes a plurality of second conductors 712X1, 712X2, ..., 712Xn (n is an integer equal to or greater than 1) extending in a direction intersecting with the extending direction of the first conductors 711Y1, 711Y2, ..., 711Ym, in the present example, in the vertical direction (Y-axis direction), and disposed in the X-axis direction in parallel in a spaced relationship by a predetermined distance from each other.

In this manner, the sensor 710 of the position detection apparatus 700 includes a configuration that detects a position indicated by the electronic pen main body unit 3C of the capacitive type using a sensor pattern formed from the first conductor group 711 and the second conductor group 712 intersecting with each other.

It is to be noted that, in the following description, when there is no necessity to distinguish the conductors from each other in regard to the first conductors 711Y1, 711Y2, ..., 711Ym, each of them is referred to as first conductor 711Y. Similarly, when there is no necessity to distinguish the conductors from each other in regard to the second conductors 712X1, 712X2, ..., 712Xn, each of them is referred to as second conductor 712X.

The pen detection circuit 720 includes a selection circuit 721 that serves as an input/output interface with the sensor 710, an amplification circuit 722, a band pass filter 723, a detection circuit 724, a sample and hold circuit 725, an AD conversion circuit 726, and a control circuit 727.

The selection circuit 721 selects one conductor 711Y or 712X from within the first conductor group 711 and the second conductor group 712 on the basis of a control signal from the control circuit 727. The conductor selected by the selection circuit 721 is connected to the amplification circuit 722, and a signal from the electronic pen main body unit 3C of the capacitive type is detected by the selected conductor and amplified by the amplification circuit 722. An output of the amplification circuit 722 is supplied to the band pass filter 723, by which only a component of a frequency of the signal transmitted from the electronic pen main body unit 3C of the capacitive type is extracted.

An output signal of the band pass filter 723 is detected by the detection circuit 724. An output signal of the detection circuit 724 is supplied to the sample and hold circuit 725, by which it is sampled and held at a predetermined timing with a sampling signal from the control circuit 727, whereafter it is converted into a digital value by the AD conversion circuit 726. Digital data from the AD conversion circuit 726 is read and processed by the control circuit 727.

The control circuit 727 operates on the basis of a program stored in an internal read-only memory (ROM) so as to send out control signals to the sample and hold circuit 725, the AD conversion circuit 726, and the selection circuit 721. Then, the control circuit 727 calculates position coordinates on the sensor 710 indicated by the electronic pen main body unit 3C of the capacitive type from digital data from the AD conversion circuit 726 and detects writing pressure detected by the writing pressure detector 36.

In this manner, it is possible to configure the electronic pen main body unit, which is an electronic pen main body unit of the capacitive type and includes a pen tip unit in and to which the core rod 34 is fitted and fixed at a position including the center line in the axial direction of the ferrite core 32 on which the coil 31 is wound. Thus, even in the case of an electronic pen main body unit of the capacitive type, the strength of the pen tip portion can be made strong by using the core rod 34 even if the ferrite core 32 itself becomes thin by slimming down.

<Connection Between Core Rod and Electronic Circuit on Printed Circuit Board>

FIGS. 16A, 16B, and 16C illustrate views depicting examples of connections between a core rod and an electronic circuit on a printed circuit board. In FIGS. 16A, 16B, and 16C, portions configured similarly to those of the electronic pen main body units 3, 3A, 3B, and 3C of the embodiments described hereinabove are denoted by like reference symbols, and detailed description of them is omitted.

Further, FIG. 16A depicts an example of a connection pattern in the case of an electronic pen main body unit of the electromagnetic coupling type. In FIG. 16A, though not depicted, an electronic circuit configured from an integrated circuit (IC), a capacitor and so forth is formed on a printed circuit board 10. Therefore, in the case of the example of FIG. 16A, a connection unit 9X is used to connect a core unit 30D, which is configured from a coil 31, a ferrite core 32, and a core rod 34, and the printed circuit board 10. In particular, the core unit 30D is configured similarly to the core unit 30' depicted in FIG. 10B, and an end portion 34b of the core rod 34 projects also from the opposite side to the pen tip side of the ferrite core 32.

Further, extension lines 311a and 311b from the opposite ends of the coil 31 are connected to a capacitor on the printed circuit board 10 to configure a resonance circuit. However, in the case of an electronic pen main body unit of the capacitive coupling type, since the core rod 34 may not be connected to the electronic circuit on the printed circuit board 10, a connection path between the core rod 34 and the electronic circuit on the printed circuit board 10 is not formed.

In contrast, in the case of an electronic pen main body unit of the capacitive type, it is necessary to transmit a signal from an oscillation circuit of an electronic circuit formed on a printed circuit board to a position detection apparatus through the core rod 34. In particular, in FIGS. 16B and 16C, though not depicted, an electronic circuit including an oscillation circuit is formed on a printed circuit board 50. Therefore, in the case of the electronic pen main body unit of the capacitive type, the core rod 34 of the core unit 30D and the oscillation circuit provided on the printed circuit board 10 are electrically connected to each other as depicted in FIGS. 16B and 16C.

In particular, in the case of FIG. 16B, the pattern depicted in FIG. 13 is depicted, and the core rod 34 is coupled directly to an electronic circuit on the printed circuit board 50 at the connection unit 9Y portion. In the case of FIG. 16C, at a connection unit 9Z portion, the core rod 34 of the core unit 30D and the electronic circuit on the printed circuit board 50 are connected to each other through a connection terminal 16. Besides, it is possible to use various connection schemes for electrically connecting the core rod 34 and the electronic circuit formed on the printed circuit board 50.

Also the core rod 34 depicted in FIGS. 16A, 16B, and 16C is formed from SUS (stainless steel) such as, for example, SUS304 or SUS316. However, the core rod 34 is not limited to this. The core rod 34 may be configured from other metal or ceramic.

It is to be noted that, while, in the example depicted in FIGS. 16A, 16B, and 16C, the core unit 30D that is a portion on the pen tip side is configured from the coil 31, the ferrite core 32, and the core rod 34, the core unit 30D is not limited to this. Also it is possible to use a portion on the pen tip side configured from the coil 31, the ferrite core 32, the core rod 38 of a pipe shape, and the core 39 similarly as in the case of the electronic pen main body unit 3A of the second embodiment. In this case, the core 39 may be made conductive and electrically connected to an oscillation circuit.

However, in this case, since the core 39 slidably moves in the core rod 38 of a pipe shape, for example, it is configured such that the core 39 fitted with and fixed to a writing pressure detector and the oscillation circuit of the printed circuit board 50 are electrically connected to each other. If this configuration is applied, then also it is possible to configure an electronic pen main body unit of the capacitive type that uses a portion on the pen tip side configured from the coil 31, the ferrite core 32, the core rod 38 of a pipe shape, and the core 39. Further, a configuration may be applied wherein the core rod 38 or both the core rod 38 and the core 39 are configured from a conductive material and the core rod 38 and the oscillation circuit of the printed circuit board 50 are electrically connected to each other.

Advantageous Effect of Embodiments

As can be recognized also from the embodiments described above, even if a slimmed down electronic pen main body unit is formed by fitting and fixing the ferrite core 32 and the core rod 34 of a fixed body or the core rod 38 of a pipe shape in and to each other, the electronic pen main body unit including a core unit (portion on the pen tip side) that is tough against external pressure and so forth can be implemented. In other words, an electronic pen that includes a core unit having high strength against external pressure even if it is slimmed down can be implemented. Especially, the electronic pen has a notable advantageous effect in that the strength of a core unit that is a portion on the pen tip side to which writing pressure is applied directly can be increased.

Further, as depicted in FIGS. 3, 7, 8, 10, 11, and 16, a second coil non-winding portion on which the coil 31 is not wound is provided on the ferrite core 32, or the ferrite core 32 is configured such that the core rod 34 or 38 projects from a rear end side of the ferrite core 32. Therefore, it is possible to simply and firmly fix a portion on the pen tip side to a printed circuit board, a tubular body portion or the like utilizing the second coil non-winding portion of the ferrite core 32 or the core rod 34 or 38 that projects from the rear end side of the ferrite core 32.

<Modifications>

In the embodiments described above, it is described that the core rod 34 or 38 is fitted with and fixed to the ferrite core 32. The core rods 34 and 38 are preferable from the point of view of strength. However, the core rods 34 and 38 may not necessarily be formed from a metal material. For example, also it is possible to replace the core rods 34 and 38 with a core rod formed from a material having strength equal to that of metal such as, for example, SUS. For example, such a material as ceramic, carbon resin, reinforced plastic or the like may be used to configure a core rod having a shape similar to that of the core rod 34 or 38 described hereinabove and use the core rod in place of the core rod 34 or 38. This similarly applies also to the core rod 81.

Further, while, in the embodiments described above, the ferrite core 32 is used as a magnetic core, the magnetic core is not limited to this. Also it is possible to use a so-called compound core that is formed by mixing various magnetic substances and other materials. In this case, the compound core is adhered to (wrapped around) a core rod such as the core rod 34 or 38 to configure a member in which the magnetic core and the core rod are fixed to each other. By wrapping a coil around this member, a core unit can be configured. The point is that the present disclosure can be implemented by using members of various configurations in which a magnetic core and a core member are fixed to each other.

Further, the connection units 9, 9A, 9B, 9C, 9X, 9Y, 9Z and so forth that function as a holder can be shaped or may have a suitable fitting portion formed thereon in response to the shape of a portion on the pen tip side including the ferrite core 32 and the core rod 34 or 38, the shape of a printed circuit board, the shape of a tubular body portion and so forth.

Further, while, in the embodiments described above, the electronic pen main body unit 3, 3A, 3B, or 3C is accommodated in a housing including a knock mechanism to configure an electronic pen, the electronic pen is not limited to this. Also it is naturally possible to accommodate the electronic pen main body unit 3, 3A, 3B, or 3C in a housing that does not include a knock mechanism to configure an electronic pen of a form in which a portion on the pen tip side normally projects from the housing.

DESCRIPTION OF REFERENCE SYMBOLS 1, 1A, 1M . . . Electronic pen, 2, 2M . . . Housing, 3, 3A, 3B, 3C . . . Electronic pen main body unit, 4 . . . Knock cam mechanism, 6 . . . Replacement core of ballpoint pen on market, 30, 30A, 30B, 30', 30X, 30Y, 30D . . . Core unit, 31, 83 . . . Coil, 32, 82 . . . Ferrite core, 33 . . . Tubular body unit, 34, 38, 81 . . . Core rod, 39 . . . Core, 36, 36A . . . Writing pressure detector, 32a . . . Coil winding portion, 32b . . . First coil non-winding portion, 32c . . . Second coil non-winding portion, 9 . . . Connection unit (holder), 10 . . . Printed board, 11 . . . Substrate cradle, 12 . . . Substrate protective pipe, 13 . . . Pipe lid

The invention claimed is:

1. An electronic pen comprising:
a housing having an opening at an end thereof;
a core unit; and
a holding member having a cylindrical body and configured to hold the core unit in the cylindrical body on a side of the core unit opposite to a pen tip side of the core unit, wherein:
the core unit is configured from a columnar magnetic core on which a coil is wound and a core rod fixed from a first end of the magnetic core to a second end of the magnetic core at a position including a center axis of the magnetic core and projecting at an end thereof from the first end of the magnetic core that is on a pen tip side of the magnetic core,
the magnetic core being different from the coil and the core rod,
the core rod is a hollow pipe, and a core body is accommodated in a hollow portion of the core rod and is configured to slidingly move in an axial direction in the hollow portion of the core rod,
the magnetic core includes a first coil non-winding portion on which the coil is not wound provided on the pen tip side of the magnetic core, and
in operation, the end of the core rod and part of the first coil non-winding portion of the magnetic core project from the opening of the housing.

2. The electronic pen according to claim 1, wherein the pen tip side of the magnetic core includes a tapered portion that gradually tapers.

3. The electronic pen according to claim 1, wherein, on a side of the magnetic core opposite to the pen tip side of the magnetic core, a second non-winding portion on which the coil is not wound is provided.

4. The electronic pen according to claim 3, wherein the second non-winding portion is configured to fit with the holding member.

5. The electronic pen according to claim 1, wherein the core rod is metal.

6. The electronic pen according to claim 1, wherein the core rod also projects from a side of the magnetic core opposite to the pen tip side of the magnetic core.

7. The electronic pen according to claim 6, wherein a portion of the core rod that projects from the side of the magnetic core opposite to the pen tip side of the magnetic core is configured to fit with the holding member.

8. The electronic pen according to claim 1, wherein the holding member is a pipe member in which a circuit board is accommodated.

9. The electronic pen according to claim 8, wherein an oscillation circuit is disposed on the circuit board, and the core rod is electrically connected to the oscillation circuit.

10. The electronic pen according to claim 8, wherein an oscillation circuit is disposed on the circuit board, and the core body is formed from a conductive material and is electrically connected to the oscillation circuit.

11. The electronic pen according to claim 1, wherein a pipe member is connected to the holder member and has a circuit board accommodated therein.

12. The electronic pen according to claim 11, further comprising:
a pressure detector configured to detect pressure applied to the end of the core rod corresponding to a movement in the axial direction of the core body accommodated in the hollow portion of the core rod.

13. The electronic pen according to claim 1, further comprising:
a pressure detector configured to detect pressure applied to the end of the core unit corresponding to a movement in an axial direction of the core unit held on the holding member.

14. The electronic pen according to claim 1, wherein the coil is connected to a capacitor and configures a resonance circuit.

15. An electronic pen main body unit configured to be accommodated in a housing of an electronic pen having an opening at an end thereof, comprising:
a tubular body;
a core unit; and
a holding member configured to hold the core unit and the tubular body on a side of the core unit opposite to a pen tip side of the core unit, wherein:
the core unit is configured from a columnar magnetic core on which a coil is wound and a core rod fixed from a first end to a second end of the magnetic core at a position including a center axis of the magnetic core and projecting at an end from the first end of the magnetic core that is on a pen tip side of the magnetic core,
the magnetic core being different from the coil and the core rod,
the core rod is a hollow pipe, and a core body is accommodated in a hollow portion of the core rod and is configured to slidingly move in an axial direction in the hollow portion of the ore rod,
the magnetic core includes a first coil non-winding portion on which the coil is not wound provided on the pen tip side of the magnetic core, and
in operation, the end of the core rod and part of the first coil non-winding portion of the magnetic core project from the opening of the housing of the electronic pen.

16. An electronic pen that includes a tubular housing that has an opening at one end in an axial direction thereof, which serves as a pen tip side, and is closed at an other end, at least one electronic pen main body unit being accommodated in the tubular housing, wherein:
the electronic pen man body unit includes a core unit configured from a columnar magnetic core on which a coil is wound and a core rod fixed from a first end of the magnetic core to a second end of a position including a center axis of the magnetic core and projecting at an end thereof from the first end of the magnetic core that is the pen tip side of the magnetic core,
the magnetic core is different from the coil and the core rod,
the core rod is a hollow pipe, and a core body is accommodated in a hollow portion of the core rod and is configured to slidingly move in an axial direction in the hollow portion of the core rod, and,
when the electronic pen is in use, the end of the core rod of the core unit projects to outside of the electronic pen from the opening of the tubular housing, and part of the pen tip side of the magnetic core projects to outside of the electronic pen from the opening.

17. The electronic pen according to claim 16, wherein the electronic pen main body unit includes a mechanism of a knock type ballpoint pen or a ballpoint pen replacement cartridge.

18. The electronic pen according to claim 16, wherein the electronic pen main body unit includes, in the housing, a mechanism of a knock type multicolor ballpoint pen that accommodates a plurality of electronic pen main body units therein and selectively projects a portion of the pen tip side of one of the plurality of electronic pen main body units to outside of the electronic pen from the opening of the housing.

* * * * *